(12) United States Patent
Tokura et al.

(10) Patent No.: US 9,994,112 B2
(45) Date of Patent: Jun. 12, 2018

(54) SHIELD APPARATUS AND WIRELESS POWER SUPPLY SYSTEM

(71) Applicant: IHI CORPORATION, Tokyo (JP)

(72) Inventors: Susumu Tokura, Tokyo (JP); Yuji Maekawa, Tokyo (JP); Kentaro Furiya, Tokyo (JP)

(73) Assignee: IHI Corporation, Tokyo (JP)

( * ) Notice: Subject to any disclaimer, the term of this patent is extended or adjusted under 35 U.S.C. 154(b) by 205 days.

(21) Appl. No.: 15/013,419

(22) Filed: Feb. 2, 2016

(65) Prior Publication Data

US 2016/0144727 A1 May 26, 2016

Related U.S. Application Data

(63) Continuation of application No. PCT/JP2014/070336, filed on Aug. 1, 2014.

(30) Foreign Application Priority Data

| Aug. 5, 2013 | (JP) | ................................ | 2013-162616 |
| Sep. 24, 2013 | (JP) | ................................ | 2013-196879 |

(51) Int. Cl.
  *H01F 27/42*  (2006.01)
  *B60L 11/18*  (2006.01)
  (Continued)

(52) U.S. Cl.
  CPC ......... *B60L 11/182* (2013.01); *B60L 11/1829* (2013.01); *H01F 27/365* (2013.01); *H01F 38/14* (2013.01); *H02J 7/025* (2013.01); *H02J 50/10* (2016.02); *H02J 50/12* (2016.02); *H02J 50/70* (2016.02); *H02J 50/80* (2016.02); *B60L 2270/147* (2013.01); *H02J 50/90* (2016.02); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
  CPC ................. H02J 7/25; H02J 5/05; H01F 38/14
  See application file for complete search history.

(56) References Cited

U.S. PATENT DOCUMENTS

| 2012/0200151 A1 | 8/2012 | Obayashi et al. |
| 2012/0242447 A1 | 9/2012 | Ichikawa |
| (Continued) | | |

FOREIGN PATENT DOCUMENTS

| DE | 102010020122 A1 | 11/2011 |
| JP | 2008-054424 A | 3/2008 |
| (Continued) | | |

OTHER PUBLICATIONS

International Search Report, PCT/JP2014/070336, dated Sep. 16, 2014, 4 pgs.

*Primary Examiner* — Sibin Chen
(74) *Attorney, Agent, or Firm* — Volpe and Koenig, P.C.

(57) ABSTRACT

A shield apparatus is used during wireless power supply from a power-transmitting coil to a power-receiving coil of a vehicle, and includes a multilayer magnetic shield member installed around the power-transmitting coil and arranged so as to surround a space between the power-transmitting coil and the power-receiving coil during supply of electric power.

20 Claims, 15 Drawing Sheets

(51) Int. Cl.
*H02J 50/12* (2016.01)
*H02J 7/02* (2016.01)
*H01F 38/14* (2006.01)
*H01F 27/36* (2006.01)
*H02J 50/10* (2016.01)
*H02J 50/80* (2016.01)
*H02J 50/70* (2016.01)
*H02J 50/90* (2016.01)

(56) References Cited

U.S. PATENT DOCUMENTS

2013/0181535 A1* 7/2013 Muratov ............... H01F 38/14
 307/104
2013/0306364 A1* 11/2013 Suzuki ............... H05K 9/0088
 174/394
2014/0346815 A1 11/2014 Keutz et al.

FOREIGN PATENT DOCUMENTS

| JP | 2009-303316 A | 12/2009 |
| JP | 2010-098807 A | 4/2010 |
| JP | 2012-196015 A | 10/2012 |
| JP | 2012-228148 A | 11/2012 |
| JP | 2013-002085 A | 1/2013 |
| JP | 2013-059239 A | 3/2013 |
| JP | 2013-516949 A | 5/2013 |
| JP | 2013-126327 A | 6/2013 |
| JP | 2015-512137 A | 4/2015 |
| WO | 2011/074091 A1 | 6/2011 |
| WO | 2011/084936 A2 | 7/2011 |

\* cited by examiner

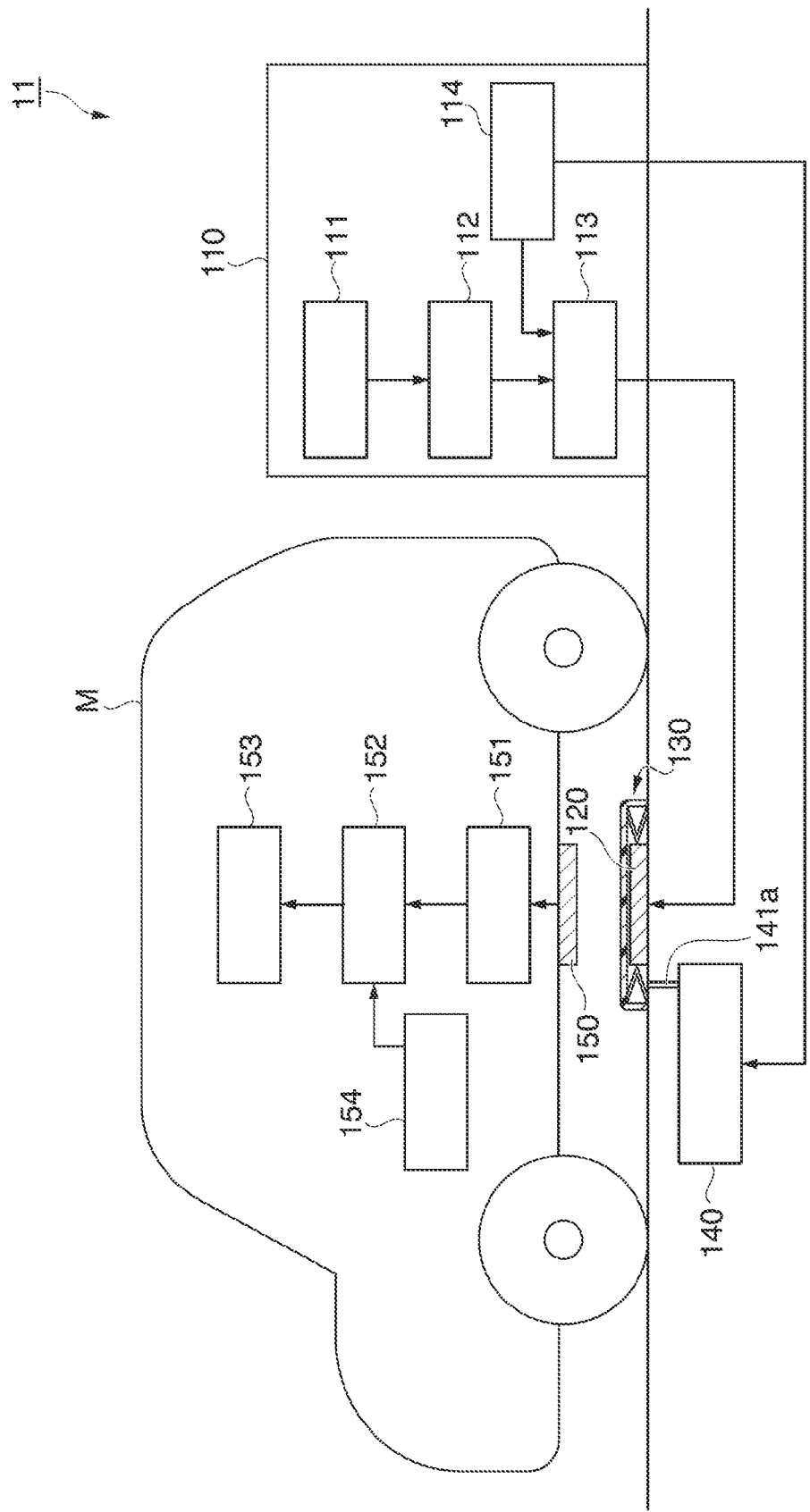

SHIELD APPARATUS AND WIRELESS POWER SUPPLY SYSTEM

This application is a Continuation application based on International Application No. PCT/JP2014/070336, filed Aug. 1, 2014, which claims priority on Japanese Patent Application No. 2013-162616, filed Aug. 5, 2013, and Japanese Patent Application No. 2013-196879, filed Sep. 24, 2013, the contents of both of which are incorporated herein by reference.

TECHNICAL FIELD

The present disclosure relates to a shield apparatus and a wireless power supply system.

BACKGROUND

In recent years, a wireless power supply system capable of wirelessly supplying electric power from the power-supplying side to the power-receiving side of the system has been actively developed. Such a wireless power supply system can supply electric power without connecting the power-supplying side and the power-receiving side through wiring (cables), and has high convenience. Therefore, the wireless power supply system is regarded as a promising system used for charging a battery mounted on a vehicle such as an electric vehicle (EV) or a hybrid vehicle (HV).

The wireless power supply system used for charging a battery mounted on a vehicle includes a power-transmitting coil which, for example, is installed on the ground surface of a parking space (a parking area) provided within a parking lot or is buried in the parking space to be flush with the ground surface. The wireless power supply system wirelessly supplies electric power from the power-transmitting coil to a power-receiving coil provided in a vehicle parked in the parking space. If the vehicle is parked so that the power-receiving coil provided in the vehicle has an appropriate positional relationship (for example, a positional relationship in which the power-receiving coil overlaps with the power-transmitting coil in plan view) with respect to the power-transmitting coil, wireless power supply is efficiently performed.

Patent Document 1 discloses a wireless power supply system in which during supply of electric power, projection-shaped shield members surround the perimeter of an area positioned between a primary self-resonance coil transmitting electric power and a secondary self-resonance coil receiving electric power transmitted from the primary self-resonance coil. In this wireless power supply system, the resonance frequency of the shield members is set to a value between the resonance frequency of the primary and secondary self-resonance coils and the frequency of triple the resonance frequency of the primary and secondary self-resonance coils, thereby reducing electromagnetic waves leaking to the outside of the shield members.

Patent Document 2 discloses a wireless power supply system which includes a power-transmitting-side shield provided in a power-transmitting-side coil, and a power-receiving-side shield provided in a power-receiving-side coil.

Patent Document 3 discloses a bag-shaped shield member which is provided between a power-transmitting coil and a power-receiving coil of a wireless power supply system and which is capable of swelling and shrinking. Patent Document 4 discloses a shield member surrounding a coil unit of a wireless power supply system. Patent Document 5 discloses a shield member in which metal material having high magnetic permeability is applied to the surface of the shield member. Patent Document 6 discloses a power-transmitting coil including a cover member used for removing a foreign object.

Patent Document 7 discloses a flap-type wheel chock provided in a vehicle-parking lot. Patent Document 8 discloses a pedal movable due to the weight of a wheel and a power-transmitting coil which moves up and down simultaneously with movement of the pedal.

DOCUMENTS OF RELATED ART

Patent Document

[Patent Document 1] Japanese Unexamined Patent Application, First Publication No. 2010-98807
[Patent Document 2] Japanese Unexamined Patent Application, First Publication No. 2012-228148
[Patent Document 3] Japanese Unexamined Patent Application, First Publication No. 2012-196015
[Patent Document 4] PCT International Publication No. WO 2011/074091
[Patent Document 5] Japanese Unexamined Patent Application, First Publication No. 2013-126327
[Patent Document 6] Japanese Unexamined Patent Application, First Publication No. 2013-59239
[Patent Document 7] Japanese Unexamined Patent Application, First Publication No. 2013-2085
[Patent Document 8] Published Japanese Translation No. 2013-516949

SUMMARY

Technical Problem

In a wireless power supply system of the electromagnetic induction method or of the magnetic resonance method, if magnetic flux generated by the power-transmitting coil forms no magnetic-flux route (a magnetic-flux route originating from a first end of the magnetic poles of the power-transmitting coil and returning to a second end of the magnetic poles) returning to the power-transmitting coil without passing through the power-receiving coil and all the magnetic flux forms magnetic-flux routes returning to the power-transmitting coil via the power-receiving coil, the power-supplying efficiency becomes the highest. However, since the power-receiving coil provided in a vehicle is disposed about a few millimeters to several tens of centimeters away from the power-transmitting coil, part of the magnetic flux may spread into surrounding spaces without passing through the power-receiving coil. Such magnetic flux does not contribute to electric power transmission from the power-transmitting coil to the power-receiving coil, and therefore the power-supplying efficiency decreases in accordance with the magnetic flux.

In the technology disclosed in Patent Document 1, since electromagnetic waves leaking to the outside can be reduced, the power-supplying efficiency can be improved. However, the technology disclosed in Patent Document 1 is restricted to a wireless power supply system (a wireless power supply system adopting a resonance method) which transmits electric power through resonance of magnetic fields, and it is difficult to apply the technology to a wireless power supply system adopting another power-supplying method. Additionally, in the technology disclosed in Patent Document 1, since a resonance circuit has to be formed using a shield member, the resonance circuit has to be adjusted to satisfy a resonance condition, and thus the degree of freedom of design may be limited.

The present disclosure is made in view of the above circumstances, and an object of the present disclosure is to provide a shield apparatus which can reduce magnetic-flux leakage to the outside, and a wireless power supply system using the shield apparatus.

Solution to Problem

In order to solve the above problems, a first aspect of the present disclosure is a shield apparatus used during wireless power supply from a power-transmitting coil to a power-receiving coil of a vehicle, the shield apparatus including: a multilayer magnetic shield member installed around the power-transmitting coil and arranged so as to surround a space between the power-transmitting coil and the power-receiving coil during supply of electric power.

A second aspect of the present disclosure is that in the shield apparatus of the first aspect, the multilayer magnetic shield member includes: a base member including a plurality of base materials disposed in layers and configured to swell and shrink, and a shield formed of at least one of a magnetic material and a conductive material on surfaces of the base materials included in the base member.

A third aspect of the present disclosure is that the shield apparatus of the second aspect further includes: a cover member provided on an upper part of the multilayer magnetic shield member so as to cover an upper side of the power-transmitting coil and the multilayer magnetic shield member.

A fourth aspect of the present disclosure is that in the shield apparatus of the third aspect, at least part of the cover member overlapping with the power-transmitting coil in plan view is formed of a non-magnetic material.

A fifth aspect of the present disclosure is that in the shield apparatus of the third or fourth aspect, the multilayer magnetic shield member is configured to be accommodated in a space between the cover member and a ground surface in a state of being folded when the base member shrinks.

A sixth aspect of the present disclosure is that the shield apparatus of any one of the second to fifth aspects further including: a supply-and-exhaust device performing supply and exhaust of gas used for swelling and shrinking the base member of the multilayer magnetic shield member.

A seventh aspect of the present disclosure is a shield apparatus shielding an electromagnetic field-generating space between a vehicle and a power-transmitting coil against the outside of the space during wireless power supply from the power-transmitting coil to the vehicle stopped at a power-supplying position within a power-supplying area, the shield apparatus including: a first pedal member arranged at a position through which a tire of the vehicle travelling to the power-supplying position passes or at another position under the tire of the vehicle stopped at the power-supplying position; a shield member shielding the electromagnetic field-generating space against the outside; and a fixing mechanism configured to switch between a state where the first pedal member is fixed to the shield member and the first pedal member and the shield member are unified, and another state where unification of the first pedal member and the shield member is canceled. The shield member is configured to move between an accommodated position in which the electromagnetic field-generating space is opened to the outside, and an expanded position in which the electromagnetic field-generating space is shielded against the outside. The first pedal member is configured to move between a standing position and a falling position. The shield member is configured to move from the accommodated position to the expanded position at the same time as movement of the first pedal member from the standing position to the falling position caused by a tire of the vehicle trampling down (pressing down) the first pedal member when the vehicle travels to the power-supplying position in a state where the fixing mechanism fixes the first pedal member to the shield member and unifies the first pedal member and the shield member together.

An eighth aspect of the present disclosure is that the shield apparatus of the seventh aspect further includes: an ingress detector detecting ingress of the vehicle into the power-supplying area and outputting a detection signal; a movement device moving the first pedal member from the falling position to the standing position; and a controller controlling the movement device and the fixing mechanism. The controller is configured to control the movement device to move the first pedal member from the falling position to the standing position in a state where fixing of the first pedal member to the shield member by the fixing mechanism is canceled, while the shield member is held in the accommodated position, when the detection signal output from the ingress detector is input into the controller, and is configured to control the fixing mechanism to fix the first pedal member to the shield member.

A ninth aspect of the present disclosure is that in the shield apparatus of the eighth aspect, the ingress detector is configured to obtain identification information of the vehicle entering the power-supplying area, and to output the detection signal to the controller when the ingress detector determines, based on the identification information, that the vehicle needs supply of electric power.

A tenth aspect of the present disclosure is that the shield apparatus of the seventh aspect further includes: a second pedal member fixed to the shield member and configured to move integrally with the shield member. The second pedal member is arranged at a position through which a tire of the vehicle passes, the vehicle travelling from the power-supplying position to the outside of the power-supplying area. The second pedal member is configured to be at a falling position in a state where the shield member is at the accommodated position, and to be at a standing position in a state where the shield member is at the expanded position. The shield member is configured to move from the expanded position to the accommodated position at the same time as movement of the second pedal member from the standing position to the falling position caused by the tire of the vehicle trampling down the second pedal member when the vehicle travels from the power-supplying position to the outside of the power-supplying area.

An eleventh aspect of the present disclosure is a wireless power supply system including: a power-transmitting coil wirelessly transmitting electric power to a vehicle; and the shield apparatus of any one of the first to tenth aspects.

Effects

According to an aspect of the present disclosure, since a multilayer magnetic shield member is arranged surrounding a space between a power-transmitting coil and a power-receiving coil during supply of electric power, it is possible to improve the power-supplying efficiency and to reduce magnetic-flux leakage to the outside.

According to another aspect of the present disclosure, a tire of a vehicle tramples down a first pedal member, whereby a shield member moves from an accommodated position to an expanded position. Magnetic-flux leakage to the outside is reduced by the shield member.

BRIEF DESCRIPTION OF DRAWINGS

FIG. 1 is a block diagram showing a main configuration of a wireless power supply system of a first embodiment of the present disclosure.

DESCRIPTION OF EMBODIMENTS (First Embodiment)

Figure 2A:
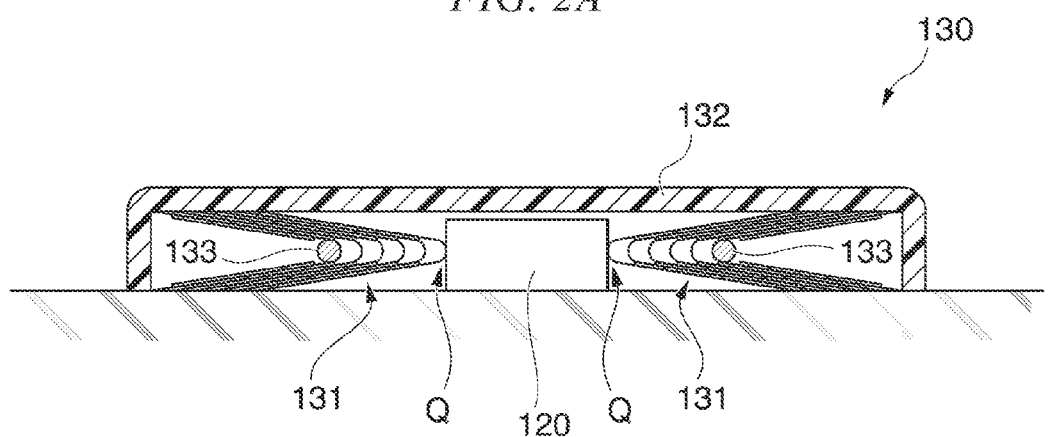
FIG. 2A is a cross-sectional side view showing a state during non-supply of electric power of a magnetic shield apparatus provided in the wireless power supply system of the first embodiment of the present disclosure.

Hereinafter, a wireless power supply system of a first embodiment of the present disclosure is described in detail with reference to the drawings. FIG. 1 is a block diagram showing a main configuration of the wireless power supply system of the first embodiment of the present disclosure. As shown in FIG. 1, a wireless power supply system 11 of this embodiment includes a power supply device 110, a power-transmitting coil 120, a magnetic shield apparatus 130 (a shield apparatus), and a power supply-used gas supply-and-exhaust device 140 (a supply-and-exhaust device). The wireless power supply system 11 wirelessly supplies electric power to a vehicle M on which a battery 153 is mounted. The wireless power supply system 11 is installed in a power-supplying station, a parking lot or the like, and wirelessly supplies electric power to the parked or stopped vehicle M.

The power supply device 110 includes a power source 111, a rectifier circuit 112, a power-supplying circuit 113, and a power-supplying controller 114. The power supply device 110 generates electric power suitable for wireless power supply to the vehicle M, and performs various control operations (described later in detail) needed for wireless power supply to the vehicle M. In this embodiment, although a configuration is described in which the power supply device 110 is installed on the ground, the power supply device 110 may be installed underground or may be installed above the vehicle M (for example, on the ceiling of a parking lot).

The output terminals of the power source 111 are connected to the input terminals of the rectifier circuit 112, and the power source 111 supplies the rectifier circuit 112 with AC power needed for power supply to the vehicle M. The power source 111 is a system power source which supplies three-phase AC of 200 V, 400 V or the like, or single-phase AC of 100 V. The input terminals of the rectifier circuit 112 are connected to the power source 111, and the output terminals of the rectifier circuit 112 are connected to the power-supplying circuit 113. The rectifier circuit 112 rectifies and converts into DC power, AC power supplied from the power source 111, and outputs the converted DC power to the power-supplying circuit 113.

The input terminals of the power-supplying circuit 113 are connected to the rectifier circuit 112, and the output terminals of the power-supplying circuit 113 are connected to two ends of the power-transmitting coil 120. The power-supplying circuit 113 converts, into AC power, DC power obtained from the rectifier circuit 112, and outputs the converted AC power to the power-transmitting coil 120. Specifically, the power-supplying circuit 113 includes a resonance capacitor, the resonance capacitor and the power-transmitting coil 120 configuring a power-supplying-side resonance circuit. The power-supplying circuit 113 converts DC power obtained from the rectifier circuit 112, into AC power (high-frequency power) having a higher frequency than that of AC power of the power source 111, and outputs the converted AC power to the power-transmitting coil 120, under control of the power-supplying controller 114.

The power-supplying controller 114 controls the power-supplying circuit 113 to generate electric power which is supplied to the vehicle M, and controls the power supply-used gas supply-and-exhaust device 140 to operate the magnetic shield apparatus 130.

Specifically, the power-supplying controller 114 controls the power supply-used gas supply-and-exhaust device 140 to supply gas to the magnetic shield apparatus 130 at the time of power supply, thereby forming a state where a space between the power-transmitting coil 120 and a power-receiving coil 150 provided in the vehicle M is surrounded by the magnetic shield apparatus 130. In addition, the power-supplying controller 114 controls the power supply-used gas supply-and-exhaust device 140 to exhaust gas from the magnetic shield apparatus 130 after power supply is finished, thereby making the magnetic shield apparatus 130 become an original state (a state where a base member 131a described later shrinks). The power-supplying controller 114 includes a CPU (Central Processing Unit), a storage and the like, and performs the above various control operations based on power-supplying control programs prepared in advance.

The high-frequency power supplied from the power-supplying circuit 113 is added to the power-transmitting coil 120, whereby the power-transmitting coil 120 generates a magnetic field and wirelessly supplies electric power to the vehicle M. Two ends of the power-transmitting coil 120 are connected to the output terminals of the power-supplying circuit 113. The power-transmitting coil 120 is installed on the ground in a state of being exposed or in a state of being covered with a molded non-magnetic and non-conductive material or with a molded weak-magnetic and non-conductive material such as plastic. Specifically, the power-transmitting coil 120 is, for example, a coil (a solenoid coil) in which a conductive wire such as a round wire or a rectangular wire is wound into a helical shape and a predetermined shape (for example, a rectangular cylindrical shape), or is a coil (a circular coil (planer coil)) in which a conductive wire such as a round wire or a rectangular wire is wound into a spiral shape on a plane.

Figure 2B:
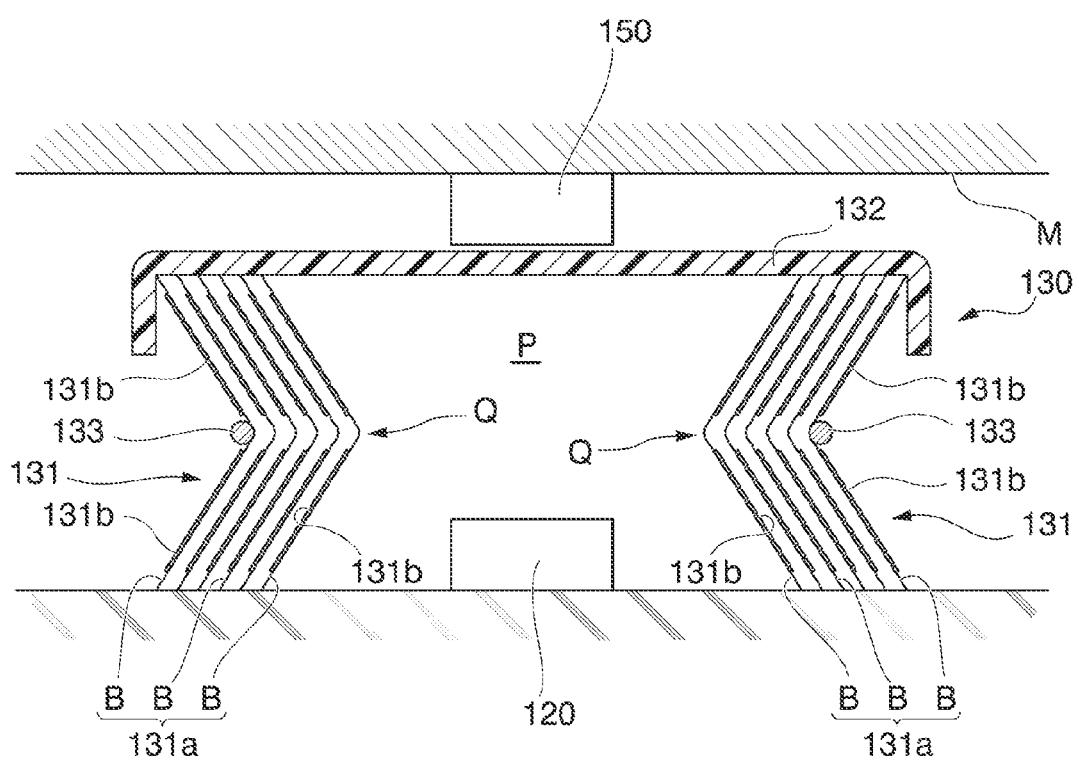
FIG. 2B is a cross-sectional side view showing a state during supply of electric power of the magnetic shield apparatus provided in the wireless power supply system of the first embodiment of the present disclosure.

The magnetic shield apparatus 130 is installed in the vicinity of the power-transmitting coil 120, and is provided in order to block magnetic flux (leakage flux) emitted from the power-transmitting coil 120 and to improve the power-supplying efficiency of the wireless power supply system 11. FIGS. 2A and 2B are cross-sectional side views showing a main configuration of the magnetic shield apparatus provided in the wireless power supply system of the first embodiment of the present disclosure. FIG. 2A is a cross-sectional side view showing a state during non-supply of electric power of the magnetic shield apparatus, and FIG. 2B is a cross-sectional side view showing a state during supply of electric power of the magnetic shield apparatus.

As shown in FIGS. 2A and 2B, the magnetic shield apparatus 130 includes a multilayer magnetic shield member 131, a cover member 132, and a band member 133. The multilayer magnetic shield member 131 is installed around the power-transmitting coil 120. During non-supply of electric power, as shown in FIG. 2A, the multilayer magnetic shield member 131 is accommodated in a space between the cover member 132 and the ground surface in a state of being folded. In contrast, during supply of electric power, as shown in FIG. 2B, the multilayer magnetic shield member 131 is arranged surrounding a space P between the power-transmitting coil 120 and the power-receiving coil 150 provided in the vehicle M.

The multilayer magnetic shield member 131 includes a base member 131a in which stretchable, non-magnetic, and non-conductive elastic materials B (base materials) such as rubber are layered, and shields 131b formed by vapor-depositing or applying magnetic material on the elastic materials B included in the base member 131a. In other words, the base member 131a includes a plurality of elastic materials B disposed in layers, and the base member 131a as a whole is configured to swell and shrink (inflate and deflate). Although the base member 131a of this embodiment includes the elastic materials B, the present disclosure is not limited to this configuration, and the base member 131a may include a plurality of base materials which are disposed in layers and have at least flexibility. If the base materials have at least flexibility, the base member 131a as a whole can swell and shrink. That is, the base member 131a is configured of a plurality of base materials disposed in layers, and the base material includes a material having elasticity or a material having flexibility. The shields 131b may be formed of at least one of a magnetic material and a conductive material on surfaces of the elastic materials B (base materials) configuring the base member 131a. The plan-view shape of the multilayer magnetic shield member 131 arbitrarily includes a circular annular shape, a rectangular annular shape or the like.

Air layers (areas in which air exists) are formed between the elastic materials B next to each other configuring the base member 131a.

Part of the multilayer magnetic shield member 131, in which the shield 131b is formed, has a higher rigidity than those of other parts (parts in which magnetic material is not provided through vapor-deposition or the like), and does not easily stretch. Accordingly, the shield 131b is not formed on the entire surface of each elastic material B forming the base member 131a, and is partially formed on each elastic material B so that the multilayer magnetic shield member 131 can be folded (refer to FIG. 2A). However, since leakage flux has to be efficiently blocked at the time of power supply (refer to FIG. 2B), for example, the shield 131b of one elastic material B may be formed to cover a gap between the shields 131b formed on elastic materials B positioned on the inside of the one elastic material B.

In order to merely block leakage flux, it is possible to use a one-layer shield member to which magnetic material is thickly applied. The following are the three main reasons why the multilayer magnetic shield member 131, in which magnetic material is thinly provided through vapor-deposition or the like, is used in this embodiment. The first reason for this is that, for example, as shown in FIG. 2A, a flexible structure capable of being folded is provided. The second reason for this is that while magnetic saturation is gradually caused from the shield 131b positioned inside, a closed magnetic circuit as a whole is formed without being magnetically saturated with magnetic flux leaking into the surroundings. The third reason for this is that it is preferable for the electrical conductivity of the shield 131b to be small, and the joule loss occurring in the multilayer magnetic shield member 131 is decreased by limiting the electrical conductivity to be small.

The cover member 132 is a hollow plate-shaped member opening at the bottom surface of the member, has a strength sufficient not to be greatly deformed even if a person steps on the cover member 132, and is provided on the upper part of the multilayer magnetic shield member 131 to cover the upper side of the power-transmitting coil 120 and the multilayer magnetic shield member 131. That is, the cover member 132 includes a plate-shaped horizontal portion extending in the horizontal direction and vertical portions extending downward from edges of the horizontal portion, and has a space between the vertical portions facing each other. As shown in FIG. 2A, the cover member 132 is provided in order to accommodate the folded multilayer magnetic shield member 131 during non-supply of electric power, and thereby to prevent breakage or the like of the multilayer magnetic shield member 131.

The space between the base member 131a, the cover member 132 and the ground surface is configured to be a sealed space (an airtight space). That is, each of the connection part between the base member 131a and the cover member 132 and the connection part between the base member 131a and the ground surface is formed to be airtight.

As shown in FIG. 2B, at the time of power supply, the cover member 132 is arranged between the power-transmitting coil 120 and the power-receiving coil 150 provided in the vehicle M in a state of contacting the power-receiving coil 150 (or in a state of being close to the power-receiving coil 150). Accordingly, at least part of the cover member 132 overlapping with the power-transmitting coil 120 in plan view is formed of a non-magnetic and non-conductive material such as plastic. Only part of the cover member 132 need not be formed of plastic or the like, but the entire cover member 132 may be formed of plastic or the like.

The band member 133 is a string-shaped member having stretchability, and is attached to a circumferential surface of a bending portion Q (an outer surface of the bending portion Q) at which the multilayer magnetic shield member 131 bends. In order that the multilayer magnetic shield member 131 in a state shown in FIG. 2B may be folded into a state shown in FIG. 2A after power supply is finished, the band member 133 is provided in order to assist the multilayer magnetic shield member 131 in bending inward at the bending portion Q, and in order to prevent the multilayer magnetic shield member 131 from bending outward at the bending portion Q. As shown in FIG. 2B, it is preferable that the distance between parts of the bending portion Q facing each other of the multilayer magnetic shield member 131 at the time of power supply be set to be at least greater than or equal to the width of the power-transmitting coil 120.

The power supply-used gas supply-and-exhaust device 140 performs supply and exhaust of gas with respect to the magnetic shield apparatus 130 under control of the power-supplying controller 114. As shown in FIG. 1, the power supply-used gas supply-and-exhaust device 140 includes an intake-and-exhaust pipe 141a communicating with a space inside the magnetic shield apparatus 130 (a space between the base member 131a of the multilayer magnetic shield member 131, the cover member 132, and the ground surface) in which the power-transmitting coil 120 is disposed. The power supply-used gas supply-and-exhaust device 140 performs supply and exhaust of gas with respect to the magnetic shield apparatus 130 via the intake-and-exhaust pipe 141a. That is, the power supply-used gas supply-and-exhaust device 140 supplies gas to and exhausts the gas from the above space via the intake-and-exhaust pipe 141a, whereby the base member 131a can be swollen and shrunk. As the gas supplied to and exhausted from the magnetic shield apparatus 130, for example, air is used.

The vehicle M is an automobile which travels on a road by being driven by a driver, and is, for example, an electric vehicle or a hybrid vehicle including a drive motor serving as a power generation source. As shown in FIG. 1, the vehicle M includes the power-receiving coil 150, a power-receiving circuit 151, a charging circuit 152, a battery 153, and a power-receiving controller 154. Although omitted in FIG. 1, travel-needed components such as a steering wheel, a brake and the drive motor are provided in the vehicle M.

The power-receiving coil 150 is a coil (a solenoid coil or a circular coil) having coil dimensions which are the same or approximately the same as those of the power-transmitting coil 120, and is provided on the bottom of the vehicle body of the vehicle M. Two ends of the power-receiving coil 150 are connected to the input terminals of the power-receiving circuit 151. When an electromagnetic field of the power-transmitting coil 120 acts on the power-receiving coil 150, the power-receiving coil 150 generates an electromotive force through electromagnetic induction, and outputs the generated electromotive force to the power-receiving circuit 151.

The input terminals of the power-receiving circuit 151 are connected to the two ends of the power-receiving coil 150, and the output terminals of the power-receiving circuit 151 are connected to the input terminals of the charging circuit 152. The power-receiving circuit 151 converts into DC power, AC power supplied from the power-receiving coil 150, and outputs the converted DC power to the charging circuit 152. The power-receiving circuit 151 includes a resonance capacitor, the resonance capacitor and the power-receiving coil 150 configuring a power-receiving-side resonance circuit. The electrostatic capacity of the resonance capacitor of the power-receiving circuit 151 is set so that the resonance frequency of the power-receiving-side resonance circuit is the same or approximately the same as the resonance frequency of the power-supplying-side resonance circuit.

The input terminals of the charging circuit 152 are connected to the output terminals of the power-receiving circuit 151, and the output terminals of the charging circuit 152 are connected to the input terminals of the battery 153. The charging circuit 152 charges the battery 153 with electric power (DC power) from the power-receiving circuit 151. The battery 153 is a rechargeable battery (a secondary battery such as a lithium-ion battery or a nickel-hydrogen battery) mounted on the vehicle M, and supplies electric power to the drive motor or the like (not shown). The power-receiving controller 154 includes a CPU, a storage and the like, and controls the charging circuit 152 based on power-receiving control programs prepared in advance.

Next, operations of the wireless power supply system 11 having the above configuration are described. A driver drives the vehicle M, moves the vehicle M to a location in which the power-transmitting coil 120 is installed, and stops the vehicle M at the location. At this time, the power-receiving controller 154 obtains the installation position of the power-transmitting coil 120. The method of obtaining the installation position of the power-transmitting coil 120 includes, for example, a method of obtaining the installation position based on output of a position sensor such as a sound wave sensor or an optical sensor (not shown). When the power-receiving controller 154 detects from the obtained installation position of the power-transmitting coil 120 that the power-receiving coil 150 of the vehicle M is arranged above the power-transmitting coil 120, the power-receiving controller 154 starts causing the charging circuit 152 to charge the battery 153.

On the other hand, the power-supplying controller 114 of the power supply device 110 obtains the position of the vehicle M based on output of a position sensor such as a sound wave sensor or an optical sensor (not shown) similar to the vehicle M. When the power-supplying controller 114 detects from the obtained position of the vehicle M that the power-receiving coil 150 of the vehicle M is arranged above the power-transmitting coil 120, the power-supplying controller 114 performs control of the power supply-used gas supply-and-exhaust device 140 to supply gas to the magnetic shield apparatus 130.

This control is performed, whereby the multilayer magnetic shield member 131 folded in a state shown in FIG. 2A is expanded to surround the perimeter of the space P between the power-transmitting coil 120 and the power-receiving coil 150 provided in the vehicle M as shown in FIG. 2B. That is, the base member 131*a* of the multilayer magnetic shield member 131 becomes a swollen state. The multilayer magnetic shield member 131 is expanded into a state shown in FIG. 2B, and thus the space between the power-transmitting coil 120 and the power-receiving coil 150 is occupied by the magnetic shield apparatus 130. Therefore, a foreign object is prevented from entering the space between the power-transmitting coil 120 and the power-receiving coil 150.

When the above operations are finished, the power-supplying circuit 113 of the power supply device 110 is controlled by the power-supplying controller 114, thereby starting the power-supplying operation. When the power-supplying operation is started, high-frequency power from the power-supplying circuit 113 is applied to the power-transmitting coil 120, and the power-transmitting coil 120 generates a magnetic field. As shown in FIG. 2B, most of magnetic flux emitted from an end surface (an upper surface) of the power-transmitting coil 120 enters the power-receiving coil 150 without passing through the multilayer magnetic shield member 131. In contrast, as shown in FIG. 2B, magnetic flux (leakage flux) not directly entering the power-receiving coil 150 enters the shield 131*b* perpendicular to the shield 131*b* (or at an angle close to perpendicular to the shield 131*b*) provided in the multilayer magnetic shield member 131.

Part of magnetic flux entering one shield 131*b* of the multilayer magnetic shield member 131 passes through the one shield 131*b*, and the other of the magnetic flux is guided toward the power-receiving coil 150 along another shield 131*b* positioned on the outside of the one shield 131*b*. In a case where the shield 131*b* is formed of a conductive material, when magnetic flux passes through the shield 131*b*, an eddy current occurs in the shield 131*b*, and a magnetic field opposite to leakage flux occurs based on the eddy current, whereby the leakage flux is blocked. In a case where the shield 131*b* is formed of a magnetic material (a ferromagnetic material), part of magnetic flux entering the shield 131*b* is guided toward the power-receiving coil 150 within the material of the shield 131*b*. When magnetic flux is guided toward the power-receiving coil 150 within the material of the shield 131*b*, other magnetic flux positioned on the inside of the above magnetic flux (positioned to be close to the power-transmitting coil 120) is restricted to head toward the power-receiving coil 150. Thus, even when the shield 131*b* is formed of either of a conductive material and a magnetic material, leakage flux, which cannot reach the power-receiving coil 150 in the related art, can reach the power-receiving coil 150. In addition, since the thickness of magnetic material or conductive material provided on the shield 131*b* through vapor-deposition or the like is small, leakage flux may not be completely blocked by the innermost shield 131*b*. However, since the shields 131*b* are arranged in multilayer, leakage flux is gradually blocked toward the outside. The shield 131*b* may be formed of at least one of a magnetic material and a conductive material, and may be formed of a magnetic and conductive material.

When the vehicle M receives electric power wirelessly supplied from the power-transmitting coil 120, in the vehicle M, the power-receiving controller 154 controls the charging circuit 152 while watching the charged state of the battery 153, thereby charging the battery 153. When the power-receiving controller 154 detects that the battery 153 has become a fully-charged state, the power-receiving controller 154 performs control for stopping the charging circuit 152, and notifies an indicator or the like (not shown, for example, an indicator which is provided in the driver's seat and shows the charged state of the battery 153) that the battery 153 has become the fully-charged state. Based on this notification, the driver can recognize that the battery 153 has become the fully-charged state.

On the other hand, when the power-supplying controller 114 of the power supply device 110 determines that power supply has been finished, the power-supplying controller 114 controls the power-supplying circuit 113 to stop the power-supplying operation. It is possible to determine whether or not the power supply is finished, based on, for example, whether or not the amount of electric power to the vehicle M sharply decreases. When the power-supplying operation is stopped, the power-supplying controller 114 performs control of the power supply-used gas supply-and-exhaust device 140 to exhaust gas which has been supplied to the magnetic shield apparatus 130. This control is performed such that the multilayer magnetic shield member 131 expanded in a state shown in FIG. 2B is folded in a state shown in FIG. 2A. That is, the base member 131*a* of the multilayer magnetic shield member 131 becomes a shrunk state. When the multilayer magnetic shield member 131 is folded, the driver can drive and move the vehicle M from the installation location of the power-transmitting coil 120.

As described above, in this embodiment, the magnetic shield apparatus 130 is installed around the power-transmitting coil 120, and the multilayer magnetic shield member 131 is expanded to surround the space between the power-transmitting coil 120 and the power-receiving coil 150 during supply of electric power. Accordingly, leakage flux emitted from the power-transmitting coil 120 can be reduced and can be guided to the power-receiving coil 150, and therefore the power-supplying efficiency can be improved and magnetic-flux leakage can be prevented.

Figure 3A:
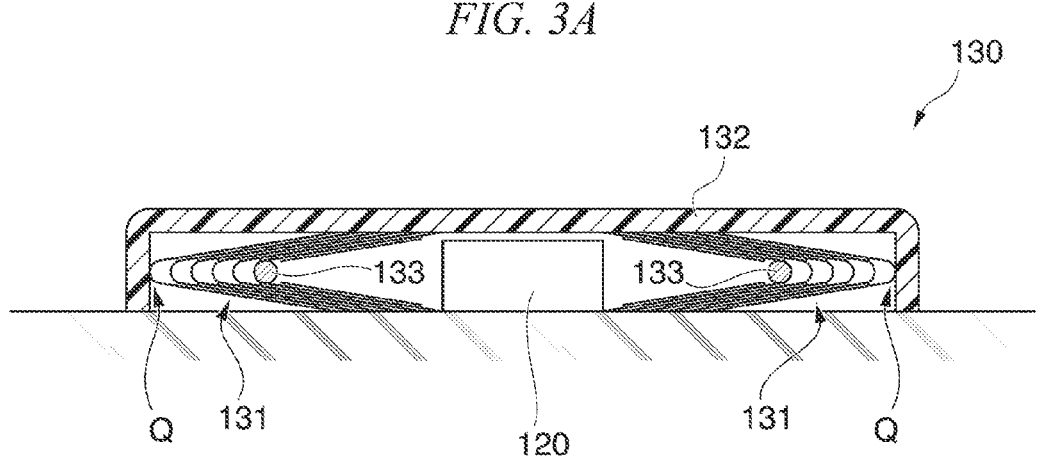
FIG. 3A is a cross-sectional side view showing a state during non-supply of electric power of a first modification of the magnetic shield apparatus provided in the wireless power supply system of the first embodiment of the present disclosure.
Figure 3B:
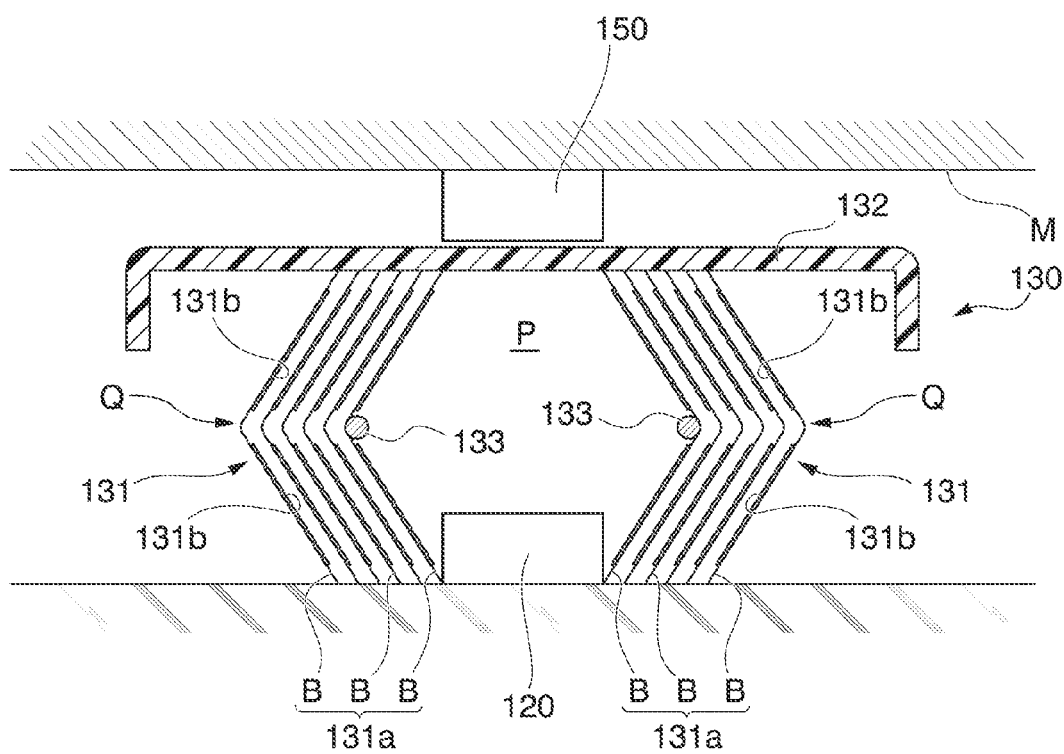
FIG. 3B is a cross-sectional side view showing a state during supply of electric power of the first modification of the magnetic shield apparatus provided in the wireless power supply system of the first embodiment of the present disclosure.

Next, a modification of the magnetic shield apparatus 130 included in the wireless power supply system 11 is described. FIGS. 3A and 3B are cross-sectional side views showing a first modification of the magnetic shield apparatus provided in the wireless power supply system of the first embodiment of the present disclosure. FIG. 3A is a cross-sectional side view showing a state during non-supply of electric power of the magnetic shield apparatus, and FIG. 3B is a cross-sectional side view showing a state during supply of electric power of the magnetic shield apparatus. In FIGS. 3A and 3B, components corresponding to components shown in FIGS. 2A and 2B are attached with the same reference signs as FIGS. 2A and 2B.

Although the multilayer magnetic shield member 131 provided in the magnetic shield apparatus 130 of the above embodiment is configured to be bent inward, a multilayer magnetic shield member 131 provided in a magnetic shield apparatus 130 of this modification is configured to be bent outward. During non-supply of electric power, as shown in FIG. 3A, the multilayer magnetic shield member 131 is accommodated in a space between the cover member 132 and the ground surface in a state of being bent outward. In contrast, during supply of electric power, as shown in FIG. 3B, the multilayer magnetic shield member 131 is arranged surrounding a space P between the power-transmitting coil 120 and the power-receiving coil 150 provided in the vehicle M in a state where the bending portion Q is bent outward.

In the above embodiment, as shown in FIG. 2B, magnetic flux (leakage flux) emitted from the power-transmitting coil 120 enters the shield 131b provided in the multilayer magnetic shield member 131 perpendicular to the shield 131b (or at an angle close to perpendicular to the shield 131b). In this modification, as shown in FIG. 3B, leakage flux enters the shield 131b at a large incident angle (at an angle closer to parallel than perpendicular to the shield 131b). Therefore, most of the leakage flux is guided toward the power-receiving coil 150 along the shield 131b, and thus the power-supplying efficiency can be improved. Unlike the above embodiment, the band member 133 of this modification is attached to an inner surface of the bending portion Q of the multilayer magnetic shield member 131, and is configured to push the bending portion Q toward the outside of the multilayer magnetic shield member 131.

Figure 4:
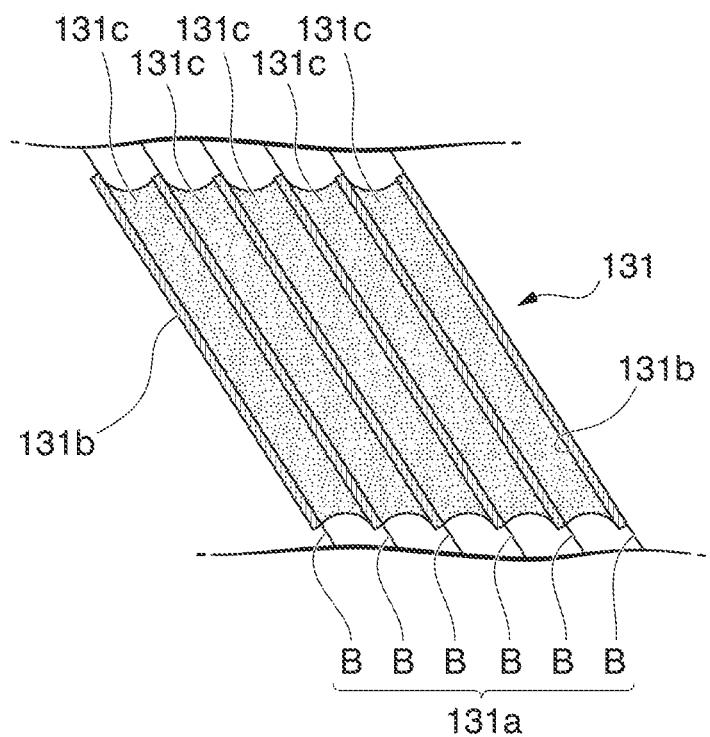
FIG. 4 is a view showing a second modification of the magnetic shield apparatus provided in the wireless power supply system of the first embodiment of the present disclosure.

FIG. 4 is a diagram showing a second modification of the magnetic shield apparatus provided in the wireless power supply system of the first embodiment of the present disclosure. FIG. 4 shows only part of the multilayer magnetic shield member 131 provided in the magnetic shield apparatus 130 in order to simplify the diagram. In the above embodiment, air layers are formed between the elastic materials B next to each other included in the base member 131a of the multilayer magnetic shield member 131. However, in this modification, resin layers 131c are formed between the elastic materials B next to each other. The resin layers 131c are formed, and thus the elastic materials B configuring the base member 131a are unified, and the strength of the base member 131a can be improved.

Hereinbefore, although the first embodiment and modifications of the present disclosure are described, the present disclosure is not limited to the above embodiment and modifications, and various modifications can be freely adopted within the scope of the present disclosure. For example, in the above embodiment and modifications, the shield 131b is formed by vapor-depositing or applying at least one of a magnetic material and a conductive material onto the base member 131a of the multilayer magnetic shield member 131. However, the shield 131b may be formed by vapor-depositing or applying both of a magnetic material and a conductive material onto the base member 131a. A forming method other than vapor-deposition or application may be adopted. For example, a flexible film-shaped shield 131b may be formed, and this film may be affixed to the surface of the elastic material B.

In the above embodiment and modifications, a configuration is described in which the multilayer magnetic shield member 131 is bent at the bending portion Q provided at one place (one place in the vertical direction). However, the multilayer magnetic shield member 131 may be bent at a plurality of places. Additionally, in the above embodiment and modifications, a configuration is described in which the multilayer magnetic shield member 131 is accommodated in the cover member 132 in a folded state. However, the cover member 132 can be omitted. In a case where the cover member 132 is omitted, the multilayer magnetic shield member 131 (the base member 131a) is configured to be, for example, a bag capable of swelling and shrinking. In a case where the multilayer magnetic shield member 131 (the base member 131a) is a bag, the bag may be configured to swell and shrink by forming the bag of a non-magnetic and non-conductive stretchable material such as rubber, or may be configured to swell and shrink by forming the bag of a non-magnetic and non-conductive flexible material.

In the above embodiment, the space between the base member 131a, the cover member 132 and the ground surface is configured to be an airtight space. However, the present disclosure is not limited to this configuration, and a bag capable of swelling and shrinking may be disposed inside the space. In a case where the base member 131a is a bag or a bag is disposed inside the space, the power supply-used gas supply-and-exhaust device 140 supplies gas to and exhausts the gas from the bag, thereby swelling and shrinking the base member 131a.

In the above embodiment, although the cover member 132 is provided on the ground surface, the cover member 132 may be configured to be accommodated in a depressed portion formed on the ground surface. In this case, the cover member 132 may be configured only of a plate-shaped horizontal portion extending in the horizontal direction. Furthermore, in this case, the multilayer magnetic shield member 131 is also accommodated in the depressed portion.

In the above embodiment, a configuration is described in which the distance between parts of the bending portion Q facing each other of the multilayer magnetic shield member 131 at the time of power supply is set to be at least greater than or equal to the width of the power-transmitting coil 120. This reason for this is that the coupling state between the power-transmitting coil 120 and the power-receiving coil 150 is not changed and the power-supplying efficiency is not decreased. However, it is possible to increase the coupling coefficient between the power-transmitting coil 120 and the power-receiving coil 150 by bringing the bending portion Q of the multilayer magnetic shield member 131 close to the power-transmitting coil 120 and the power-receiving coil 150. It should be noted that this adjustment is performed within a range in which the power-supplying efficiency is not greatly decreased.

In the above embodiment, although the magnetic resonance method is adopted as a method of wireless power supply, the electromagnetic induction method may be adopted.

(Second Embodiment)

A second embodiment of the present disclosure is described with reference to the drawings. The same components in the drawings of the second embodiment are attached with the same reference signs, and duplicate descriptions are omitted.

Figure 5:
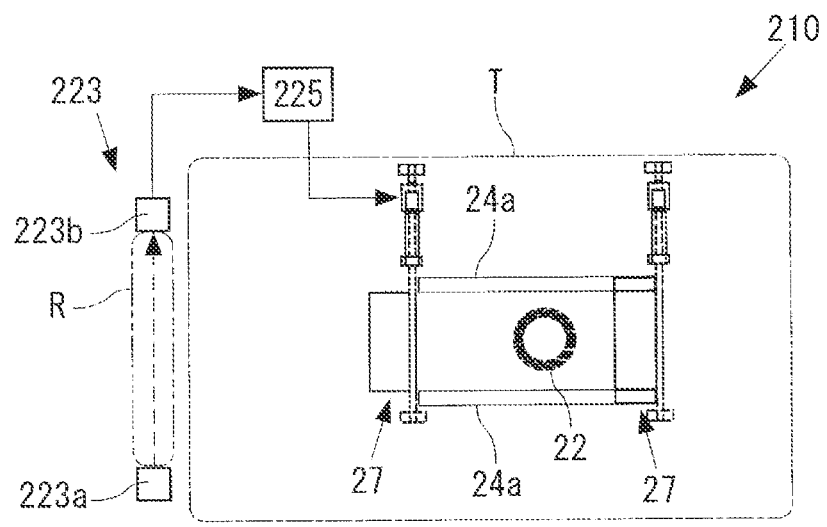
FIG. 5 is a plan view showing an overall configuration of a shield apparatus of a second embodiment of the present disclosure.

FIG. 5 is a plan view showing a shield apparatus 210 of the second embodiment of the present disclosure. The shield apparatus 210 of the second embodiment of the present disclosure shields a space (hereinafter, referred to as an electromagnetic field-generating space S) between a vehicle 21 (for example, an electric vehicle, not shown in FIG. 5) and a power-transmitting coil 22 of a power supply device against the outside of the space at the time the power-transmitting coil 22 wirelessly supplies electric power to the vehicle 21 stopped at a power-supplying position within a power-supplying area T (the area enclosed by a dashed-dotted line in FIG. 5).

Figure 6A:
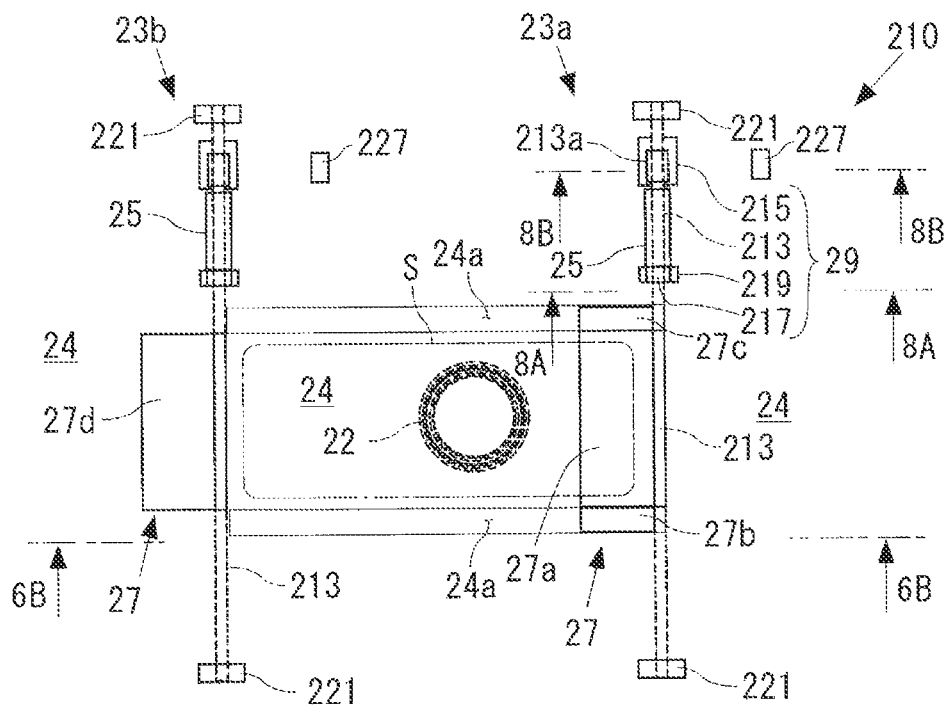
FIG. 6A is a plan view showing a state of the shield apparatus of the second embodiment of the present disclosure before a vehicle enters a power-supplying position.
Figure 6B:
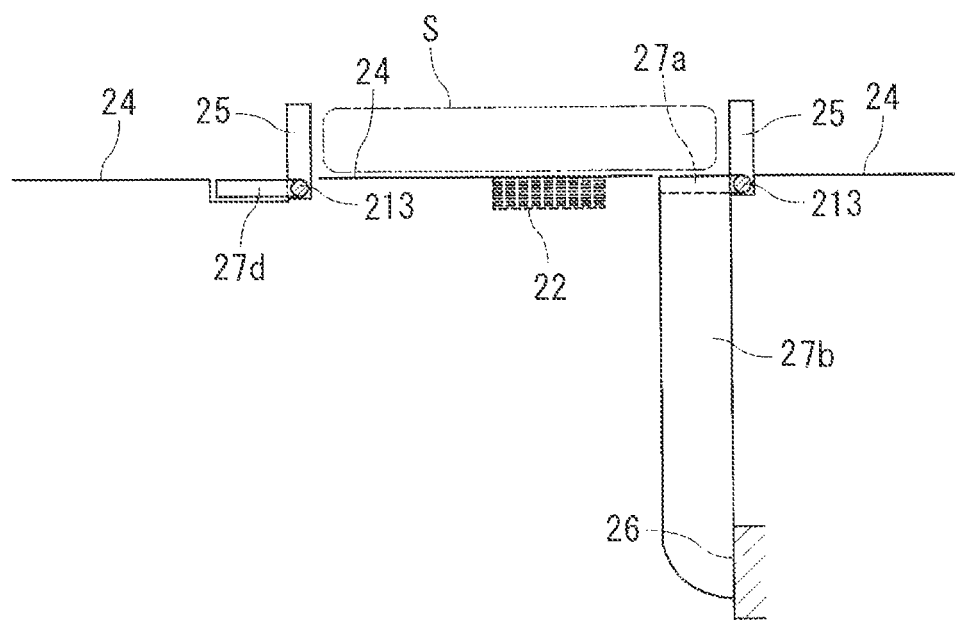
FIG. 6B is a view taken along 6B-6B line of FIG. 6A.
Figure 7A:
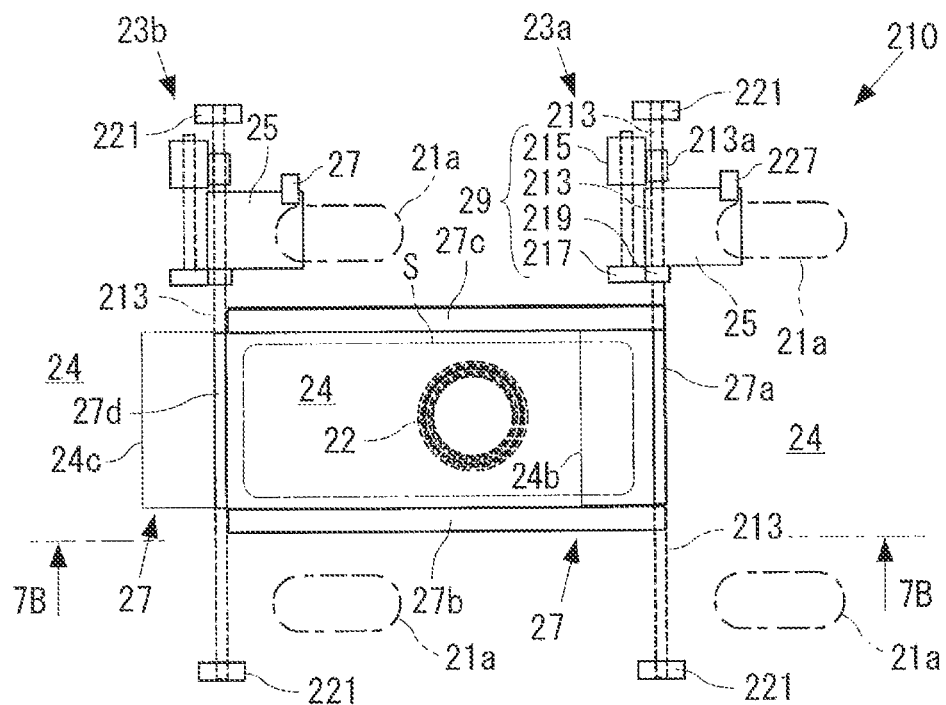
FIG. 7A is a plan view showing a state of the shield apparatus of the second embodiment of the present disclosure at the time the vehicle stops at the power-supplying position.
Figure 7B:
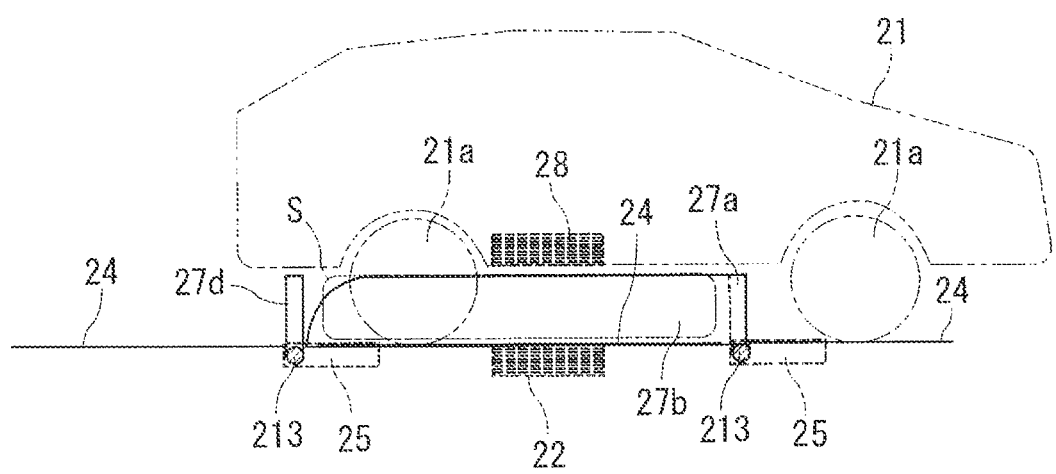
FIG. 7B is a view taken along 7B-7B line of FIG. 7A.

FIGS. 6A, 6B, 7A and 7B show the inside of the power-supplying area T. FIG. 6A is a plan view of the shield apparatus 210, and FIG. 6B is a view taken along 6B-6B line of FIG. 6A. FIG. 7A is a plan view of the shield apparatus 210, and FIG. 7B is a view taken along 7B-7B line of FIG. 7A. FIGS. 6A and 6B show a state before the vehicle 21 enters the power-supplying position. FIGS. 7A and 7B show a state where the vehicle 21 stops at the power-supplying position. FIG. 7A shows only tires 21a of the vehicle 21.

The shield apparatus 210 includes a first structure 23a and a second structure 23b. For example, the first structure 23a is disposed on the front wheel side of the vehicle 21 at the power-supplying position, and the second structure 23b is disposed on the rear wheel side of the vehicle 21 at the power-supplying position. First, the first structure 23a is described.

Figure 8A:
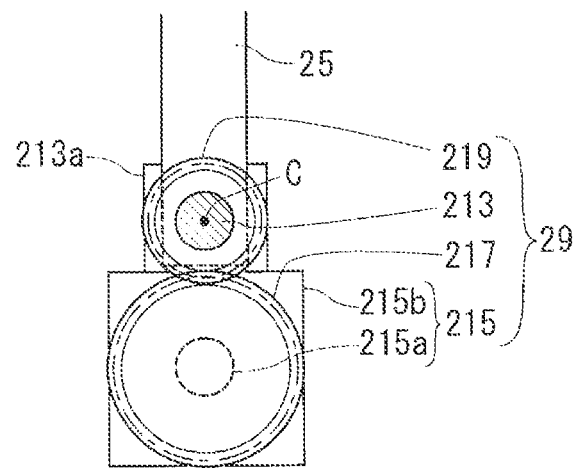
FIG. 8A is a view taken along 8A-8A line of FIG. 6A.
Figure 8B:
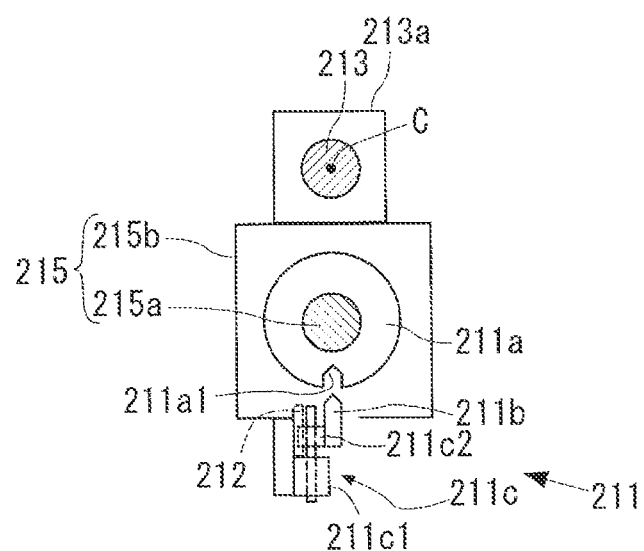
FIG. 8B is a view taken along 8B-8B line of FIG. 6A.

The first structure 23a includes a pedal member 25 (a first pedal member), a shield member 27, a movement device 29, and a fixing mechanism 211 (refer to FIG. 8B described later).

The pedal member 25 is arranged at a position through which a tire 21a of the vehicle 21 passes when the vehicle 21 enters the power-supplying area T and travels to the power-supplying position. The pedal member 25 is formed in a plate shape. The vehicle 21 enters the power-supplying area T through a predetermined entrance of the power-supplying area T and is configured so that the tire 21a passes on a predetermined pass route within the power-supplying area T. This pass route is shown using a mark. Instead of this, the tire 21a of the vehicle 21 may be configured to pass only through the pass route by a limited space or by a guide member in the power-supplying area T.

The pedal member 25 is rotatably supported by a rotary shaft 213 (described later), and is configured to rotate around a rotation axis C (refer to FIG. 8A) and to move between a standing position and a falling position. The standing position denotes a position in which the pedal member 25 projects upward from a travelling surface 24 (ground surface) on which the tires 21a of the vehicle 21 roll, and the falling position denotes a position in which the pedal member 25 falls down and a first surface (upper surface during falling) of the pedal member 25 is approximately parallel to the travelling surface 24. Although it is preferable that the first surface of the pedal member 25 be flat, a second surface of the pedal member 25 need not be flat.

It is preferable that a recess (not shown), in which the pedal member 25 at the falling position is accommodated, be formed on the travelling surface 24. In this case, it is preferable that the flat upper surface of the pedal member 25 at the falling position be positioned at approximately the same height as the travelling surface 24. The pedal member 25 may be configured so that the tire 21a of the vehicle 21 rolls on the upper surface of the pedal member 25 in this state.

The shield member 27 is provided in order to shield the electromagnetic field-generating space S (the space enclosed by a dashed-dotted line in FIG. 6A) against the outside of the space. The shield member 27 is configured to move between an accommodated position (a state of FIGS. 6A and 6B) in which the electromagnetic field-generating space S is opened to the outside, and an expanded position (a state of FIGS. 7A and 7B) in which the electromagnetic field-generating space S is shielded against the outside. The accommodated position denotes a position in which the shield member 27 is disposed under the travelling surface 24, and the expanded position denotes a position in which the shield member 27 projects upward from the travelling surface 24. In this embodiment, the shield member 27 is fixed to the rotary shaft 213 (for example, refer to FIGS. 6A and 6B). The shield member 27 is formed of a material suitable for blocking an electromagnetic field (for example, a magnetic material, a non-magnetic and conductive material, or a composite material of the magnetic material and the non-magnetic and conductive material).

In the example of FIGS. 6A, 6B, 7A and 7B, the shield member 27 includes a first shield 27a, a second shield 27b and a third shield 27c. The first shield 27a is formed in a rectangular plate shape, and the second and third shields 27b and 27c are formed in an approximately rectangular plate shape. In a state where the vehicle 21 is at the power-supplying position and the shield member 27 is at the expanded position, the first shield 27a is disposed on a first side (right side in FIGS. 7A and 7B) in the front-and-rear direction of the vehicle 21, the second shield 27b is disposed on a first side (lower side in FIG. 7A) in the left-and-right direction of the vehicle 21, and the third shield 27c is disposed on a second side (upper side in FIG. 7A) in the left-and-right direction of the vehicle 21. Additionally, in a state where the vehicle 21 is at the power-supplying position and the shield member 27 is at the expanded position, the first shield 27a extends in the left-and-right direction (the up-and-down direction in FIG. 7A) of the vehicle 21 and shields the electromagnetic field-generating space S against the outside from the first side (right side in FIGS. 7A and 7B) in the front-and-rear direction of the vehicle 21, the second shield 27b extends in the front-and-rear direction (the left-and-right direction in FIGS. 7A and 7B) of the vehicle 21 and shields the electromagnetic field-generating space S against the outside from the first side (lower side in FIG. 7A) in the left-and-right direction of the vehicle 21, and the third shield 27c extends in the front-and-rear direction (the left-and-right direction in FIGS. 7A and 7B) of the vehicle 21 and shields the electromagnetic field-generating space S against the outside from the second side (upper side in FIG. 7A) in the left-and-right direction of the vehicle 21.

The first shield 27a is accommodated in a recess 24b (refer to FIG. 7A) of the travelling surface 24 when the first shield 27a is at the accommodated position. When the second and third shields 27b and 27c move from the accommodated position to the expanded position, the second and third shields 27b and 27c move from the lower side to the upper side of the travelling surface 24 through elongated openings 24a (areas enclosed by thin lines in FIG. 6A) of the travelling surface 24. In this embodiment, the second and third shields 27b and 27c are fixed to the first shield 27a.

The movement device 29 moves the pedal member 25 from the falling position to the standing position. The movement device 29 is described with reference to FIGS. 8A and 8B. FIG. 8A is a view taken along 8A-8A line of FIG. 6A, and FIG. 8B is a cross-sectional view taken along 8B-8B line of FIG. 6A. As shown in FIG. 8A, the movement device 29 includes the rotary shaft 213 to which the shield member 27 is fixed, an electric motor 215 fixed to the rotary shaft 213, a first gear 217 fixed to an output shaft 215a of the motor 215, and a second gear 219 fixed to the pedal member 25 coaxially with the rotation axis C of the pedal member 25. A structure 215b (for example, a casing) on the stator side of the motor 215 is fixed to the rotary shaft 213. In the example of FIG. 8A, the motor 215 (namely, the structure 215b on the stator side) is fixed to a cross-section-enlarged part 213a fixed to the rotary shaft 213. The second gear 219 engages with the first gear 217. Thus, the output shaft 215a of the motor 215 rotates, whereby the second gear 219 rotates, and thus the pedal member 25, to which the second gear 219 is fixed and which is supported by the rotary shaft 213 to be rotatable relative to the rotary shaft 213, also rotates around the rotation axis C.

According to the movement device 29 having the above configuration, the motor 215 rotates, whereby the pedal member 25 rotates (by only 90° in the example of FIGS. 5 to 8B) around the rotation axis C. As a result, the pedal member 25 moves from the falling position to the standing position, or moves from the standing position to the falling position.

Another gear may be interposed between the first and second gears 217 and 219. That is, the motor 215 may rotate the pedal member 25 around the rotation axis C via the first gear 217, the other gear, and the second gear 219.

The rotary shaft 213 is supported by a plurality of bearings 221 to be rotatable around the central axis of the rotary shaft 213, the bearings 221 being attached to a stationary structure. The stationary structure denotes a structure fixed to the travelling surface 24 on which the tires 21a of the vehicle 21 roll (hereinafter, the same).

The fixing mechanism 211 (refer to FIG. 8B) fixes the pedal member 25 to the shield member 27 and unifies the pedal member 25 and the shield member 27 together. In more detail, the fixing mechanism 211 fixes the pedal member 25 to the rotary shaft 213, and thus the pedal member 25 is fixed to the shield member 27 via the rotary shaft 213. In addition, the fixing mechanism 211 can switch between a state where the pedal member 25 is fixed to the shield member 27 and the pedal member 25 and the shield member 27 are unified, and a state where unification of the pedal member 25 and the shield member 27 is canceled. In the example of FIG. 8B, the fixing mechanism 211 includes an engaged part 211a fixed to the output shaft 215a of the motor 215, an engaging part 211b (an engaging pin in the example of FIG. 8B) which engages with the engaged part 211a, and a drive device 211c which reciprocates the engaging part 211b. In the example of FIG. 8B, the engaged part 211a is provided with an engaged hole 211a1. The engaged hole 211a1 extends in the radial direction from the central axis of the output shaft 215a, and opens to the outside in the radial direction of the output shaft 215a at an outer end in the radial direction of the engaged part 211a (at an outer circumferential surface of the engaged part 211a). The position of the engaged hole 211a1 is set to be a position facing the engaging part 211b when the pedal member 25 is at the standing position. The drive device 211c reciprocates the engaging part 211b between an engagement position and an engagement-released position. Thus, when the engaging part 211b is moved from the engagement-released position to the engagement position in a state where the pedal member 25 is at the standing position, the engaging part 211b is inserted into the engaged hole 211a1. The engaging part 211b and the drive device 211c are attached to the structure 215b on the stator side of the motor 215. In the example of FIG. 8B, the drive device 211c includes an electric motor 211c1 fixed to the structure 215b on the stator side of the motor 215, a screwed member (for example, a nut) 211c2 screwed on an output shaft (for example, a male screw) of the motor 211c1. The engaging part 211b is fixed to the screwed member 211c2. Although the screwed member 211c2 is connected to a guide member 212 (a member shown by a dashed line in FIG. 8B) fixed to the structure 215b on the stator side and cannot rotate, the screwed member 211c2 is configured to move in the reciprocation direction of the engaging part 211b. Thus, when the output shaft of the motor 211c1 rotates, the screwed member 211c2 and the engaging part 211b move in the reciprocation direction.

The drive device 211c may include another structure which reciprocates the engaging part 211b between the engagement position and the engagement-released position. For example, the engaging part 211b may be reciprocated using a hydraulic device or a pneumatic device.

The pedal member 25 is switched between a state of being fixed to the shield member 27 by the fixing mechanism 211, and a state of being not fixed to the shield member 27. The pedal member 25 is configured to move between the standing position and the falling position. This movement is a rotational movement of the pedal member 25 around the rotation axis C. The rotary shaft 213 penetrates the pedal member 25 and the second gear 219, and the pedal member 25 and the second gear 219 are rotatable relative to the rotary shaft 213 around the central axis of the rotary shaft 213. The rotation axis C of the pedal member 25 and the second gear 219 is coaxial with the central axis of the rotary shaft 213. The pedal member 25 rotates integrally with the rotary shaft 213 and the shield member 27 around the rotation axis C in a state where the pedal member 25 is fixed to the shield member 27. In contrast, the pedal member 25 rotates relative to the rotary shaft 213 and the shield member 27 around the rotation axis C in a state where the pedal member 25 is not fixed to the shield member 27.

The second structure 23b includes a pedal member 25, a shield member 27, a movement device 29, and a fixing mechanism 211 similarly to the first structure 23a.

The structures of the pedal member 25, the movement device 29 and the fixing mechanism 211 of the second structure 23b are the same as the structures of the pedal member 25, the movement device 29 and the fixing mechanism 211 of the first structure 23a, respectively.

In the example of FIGS. 6A, 6B, 7A and 7B, the shield member 27 of the second structure 23b includes a fourth shield 27d. The fourth shield 27d is formed in a rectangular plate shape. In a state where the vehicle 21 is at the power-supplying position and the shield member 27 is at the expanded position, the fourth shield 27d is disposed on a second side (left side in FIGS. 7A and 7B) in the front-and-rear direction of the vehicle 21. Additionally, in a state where the vehicle 21 is at the power-supplying position and the shield member 27 is at the expanded position, the fourth shield 27d extends in the left-and-right direction (the up-and-down direction in FIG. 7A) of the vehicle 21, and shields the electromagnetic field-generating space S against the outside from the second side (left side of FIGS. 7A and 7B) in the front-and-rear direction of the vehicle 21.

The fourth shield 27d is accommodated in a recess 24c (refer to FIG. 7A) of the travelling surface 24 when the fourth shield 27d is at the accommodated position.

Although specific steps are described later, the shield member 27 of this embodiment is configured to move from the accommodated position to the expanded position at the same time as movement of the pedal member 25 from the standing position to the falling position caused by the tire 21a of the vehicle 21 trampling down (pressing down) the pedal member 25, the vehicle 21 travelling to the power-supplying position, in a state where the fixing mechanism 211 fixes the pedal member 25 to the shield member 27 and unifies the pedal member 25 and the shield member 27 together.

The shield apparatus 210 of this embodiment includes an ingress detector 223 and a controller 225 (refer to FIG. 5).

The ingress detector 223 detects ingress of the vehicle 21 into the power-supplying area T, and outputs a detection signal showing the ingress. In this embodiment, the ingress detector 223 outputs the detection signal when the ingress detector 223 detects that the vehicle 21 has entered a detection area R (the area enclosed by a dashed doubledotted line in FIG. 5). The detection area R is an area through which the vehicle 21 passes when the vehicle 21 enters the power-supplying area T. The detection area R is, for example, an entrance of the power-supplying area T.

The ingress detector 223 includes, for example, a light emitter 223a and a light receiver 223b. When the vehicle 21 enters the power-supplying area T, the light emitter 223a continues emitting light traversing the detection area R through which the vehicle 21 passes. For example, the light emitter 223a continues emitting light passing through the detection area R in a direction orthogonal to another direction in which the vehicle 21 enters the power-supplying area T. The light receiver 223b receives light which has been emitted from the light emitter 223a and has passed through the detection area R. When the vehicle 21 passes through the detection area R, light from the light emitter 223a is interrupted by the vehicle 21. As a result, the light receiver 223b does not receive light from the light emitter 223a. Thus, the ingress detector 223 detects ingress of the vehicle 21 into the power-supplying area T based on the fact that the light receiver 223b does not sense light.

The ingress detector 223 may detect ingress of the vehicle 21 into the power-supplying area T using another appropriate structure. For example, the structure includes a pressure sensor which senses the weight of the vehicle 21.

The controller 225 receives the detection signal from the ingress detector 223. When the controller 225 receives the detection signal, the controller 225 controls the movement device 29 to move the pedal member 25 from the falling position to the standing position in each of the first and second structures 23a and 23b. That is, the controller 225 rotates the output shaft 215a of the motor 215 by a predetermined amount of rotation in a direction in which the pedal member 25 moves from the falling position to the standing position. Next, the controller 225 operates the fixing mechanism 211, thereby fixing the pedal member 25 to the shield member 27. That is, the controller 225 controls the drive device 211c to move the engaging part 211b from the engagement-released position to the engagement position. Therefore, the engaging part 211b becomes a state of being inserted into the engaged hole 211a1. In this state, the output shaft 215a of the motor 215 cannot rotate relative to the structure 215b on the stator side due to engagement between the engaging part 211b and the engaged hole 211a1. Thus, in each of the first and second structures 23a and 23b, the pedal member 25 becomes a state of being fixed to the rotary shaft 213 and the shield member 27.

Although specific steps are described later, the controller 225 of this embodiment is configured to control the movement device 29 to move the pedal member 25 from the falling position to the standing position in a state where fixing of the pedal member 25 to the shield member 27 by the fixing mechanism 211 is canceled, while the shield member 27 is held in the accommodated position, when the detection signal output from the ingress detector 223 is input into the controller 225, and thereafter, is configured to control the fixing mechanism 211 to fix the pedal member 25 to the shield member 27.

Figure 9:
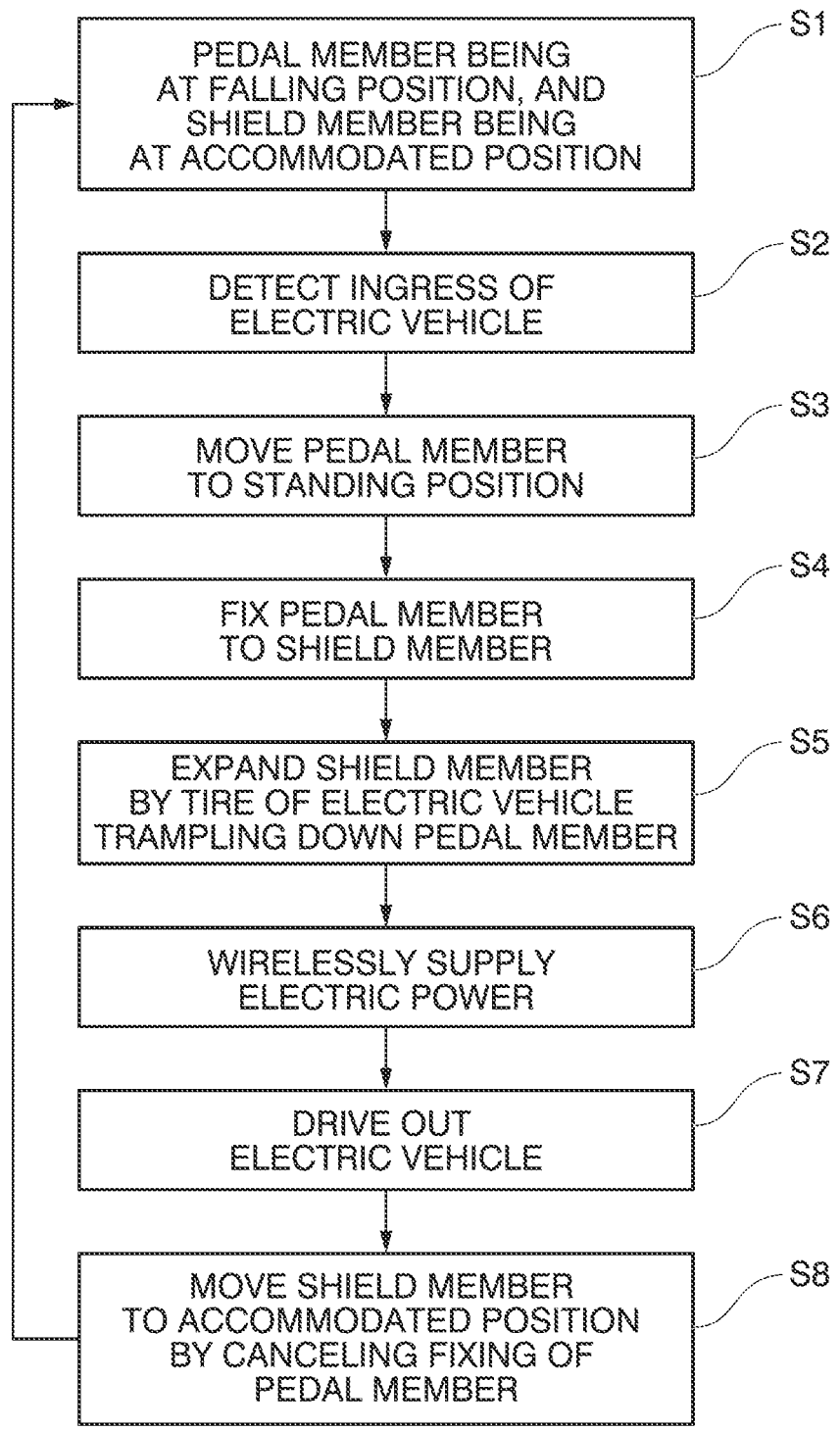
FIG. 9 is a flowchart of a shield member-expanding method using the shield apparatus of the second embodiment of the present disclosure.

FIG. 9 is a flowchart of a shield member-expanding method. This method is performed using the shield apparatus 210.

In the step S1, as shown in FIGS. 6A and 6B, the pedal member 25 is at the falling position, and the shield member 27 is at the accommodated position. Additionally, in the step S1, the pedal member 25 is not fixed to the shield member 27.

In the step S2, the ingress detector 223 detects ingress of the vehicle 21 into the power-supplying area T, and outputs a detection signal showing the ingress.

In the step S3, the detection signal from the ingress detector 223 is input into the controller 225. Accordingly, the controller 225 controls the movement device 29 to move the pedal member 25 from the falling position to the standing position in each of the first and second structures 23a and 23b. That is, the pedal member 25 rotates relative to the rotary shaft 213 and the shield member 27 by drive of the motor 215, and moves from the falling position to the standing position. At this time, the shield member 27 is maintained in the accommodated position due to the weight of the shield member 27 and the rotary shaft 213.

In the step S3, in the example of FIGS. 5 to 8B, the pedal member 25 rotates only by 90° around the rotation axis C, and thus moves from the falling position to the standing position.

In the step S4, the controller 225 operates the fixing mechanism 211 in a state where the pedal member 25 is at the standing position and the shield member 27 is at the accommodated position, in each of the first and second structures 23a and 23b, thereby fixing the pedal member 25 to the shield member 27. That is, the controller 225 controls the drive device 211c to move the engaging part 211b from the engagement-released position to the engagement position.

In the step S5, the vehicle 21 approaches the power-supplying position of the power-supplying area T by self-propelled, a tire 21a of the vehicle 21 passes through the pedal member 25 under the tire 21a of the vehicle 21, and the vehicle 21 stops at the power-supplying position. That is, a tire 21a on the forward side in an approach direction of the vehicle 21 passes through the pedal member 25 of the first structure 23a, and another tire 21a on the backward side in the approach direction of the vehicle 21 passes through the pedal member 25 of the second structure 23b. At this time, these tires 21a trample down the pedal members 25 of the first and second structures 23a and 23b. As a result, in each of the first and second structures 23a and 23b, the position of the pedal member 25 changes into the falling position. At the same time as this, in each of the first and second structures 23a and 23b, the shield member 27 moves from the accommodated position to the expanded position. That is, the shield member 27 moves from the accommodated position to the expanded position at the same time as movement of the pedal member 25 from the standing position to the falling position caused by the tire 21a of the vehicle 21 trampling down the pedal member 25, the vehicle 21 travelling to the power-supplying position, in a state where the fixing mechanism 211 fixes the pedal member 25 to the shield member 27 and unifies the pedal member 25 and the shield member 27 together. Thus, the electromagnetic field-generating space S is shielded by the shield member 27 against the outside.

In the step S5, in the example of FIGS. 5 to 8B, the pedal member 25 rotates only by 90° around the rotation axis C, thereby moving from the standing position to the falling position, and the shield member 27 rotates only by 90° around the central axis of the rotary shaft 213, thereby moving from the accommodated position to the expanded position.

In the step S5, in each of the first and second structures 23a and 23b, when the movement of the pedal member 25 to the falling position finishes, a holding member 227 (for example, refer to FIGS. 6A and 7A) holds the pedal member 25 in the falling position. In more detail, a position detector (not shown) detects that the pedal member 25 is at the falling position, and when this condition is detected, the controller 225 controls a drive device (not shown) of the holding member 227 to move the holding member 227 in the central axis direction of the rotary shaft 213 from a state of FIG. 6A to a state of FIG. 7A on the upper side of the pedal member 25. Therefore, part of the holding member 227 and part of the pedal member 25 are arranged in series in the up-and-down direction. As a result, the holding member 227 engages with the upper surface of the pedal member 25 at the falling position, and holds the pedal member 25 in the falling position. The holding member 227 is attached to the stationary structure to be movable in the central axis direction of the rotary shaft 213. The holding member 227 can reciprocate in the central axis direction of the rotary shaft 213 using an appropriate means (the drive device). The position detector is, for example, a sensor which contacts the pedal member 25 when the pedal member 25 is at the falling position, and detects, based on this contact, that the pedal member 25 is at the falling position.

The moving direction of the holding member 227 is not limited to the central axis direction of the rotary shaft 213, but may be a direction which is orthogonal to the central axis direction and is parallel to a horizontal plane. Instead of the holding member 227, another holding member holding the shield member 27 in the expanded position may be provided.

The holding member 227 is moved to a position (a position shown in FIG. 6A) in which the holding member 227 does not interfere with the pedal member 25, when the pedal member 25 moves from the falling position to the standing position in the step S3. This movement of the holding member 227 is performed by the controller 225 controlling the drive device (not shown) of the holding member 227. In addition, this movement is performed after the step S2 and before the step S3 is started, based on the fact that the controller 225 receives the detection signal.

In the step S6, in a state where the electromagnetic field-generating space S is surrounded and shielded by the shield member 27 on the entire perimeter in plan view of the electromagnetic field-generating space S, electric power is wirelessly supplied from the power-transmitting coil 22 to a power-receiving coil 28 of the vehicle 21. Accordingly, a battery of the vehicle 21 is charged.

In the step S7, after charging of the battery of the vehicle 21 is finished, the vehicle 21 travels to the outside of the power-supplying area T in the approach direction at the step S5 or in the opposite direction to the approach direction.

In the step S8, when the vehicle 21 reaches the outside of the power-supplying area T at the step S7, the controller 225 controls the fixing mechanism 211 to cancel fixing of the pedal member 25 to the shield member 27 by the fixing mechanism 211. That is, the controller 225 controls the drive device 211c to move the engaging part 211b from the engagement position to the engagement-released position. Therefore, the shield member 27 moves from the expanded position to the accommodated position due to its own weight. The shape of and the center of gravity of the shield member 27 are set so that this movement is performed. In this case, since the shield member 27 at the accommodated position is supported by a supporting surface 26 of the stationary structure as shown in FIG. 6B, the shield member 27 is configured not to rotate beyond the accommodated position due to its weight.

In the step S8, arrival of the vehicle 21 at the outside of the power-supplying area T in the step S7 may be detected through the following steps. For example, a light emitter and a light receiver similar to the light emitter 223a and the light receiver 223b, respectively, are provided in the power-supplying position. In this case, when the vehicle 21 stops at the power-supplying position, light from the light emitter is blocked by the vehicle and does not reach the light receive. In contrast, when the vehicle 21 moves from the power-supplying position, light from the light emitter reaches the light receiver, and thus a signal indicating this reception is output from the light receiver to the controller 225. When the controller 225 receives this signal, the controller 225 starts the control of the step S8.

When the step S8 is finished, returning to the step S1, the steps S1 to S8 are repeated. The steps S7 and S8 may be performed at the same time, or may be performed in the opposite order to the above-described order.

As described above, in the second embodiment, the perimeter of the power-transmitting coil 22 is surrounded by the shield member 27 during supply of electric power. Accordingly, leakage flux emitted from the power-transmitting coil 22 can be reduced and can be guided to the power-receiving coil 28 of the vehicle 21, and therefore, magnetic-flux leakage to the outside can be prevented.

Figure 15A:
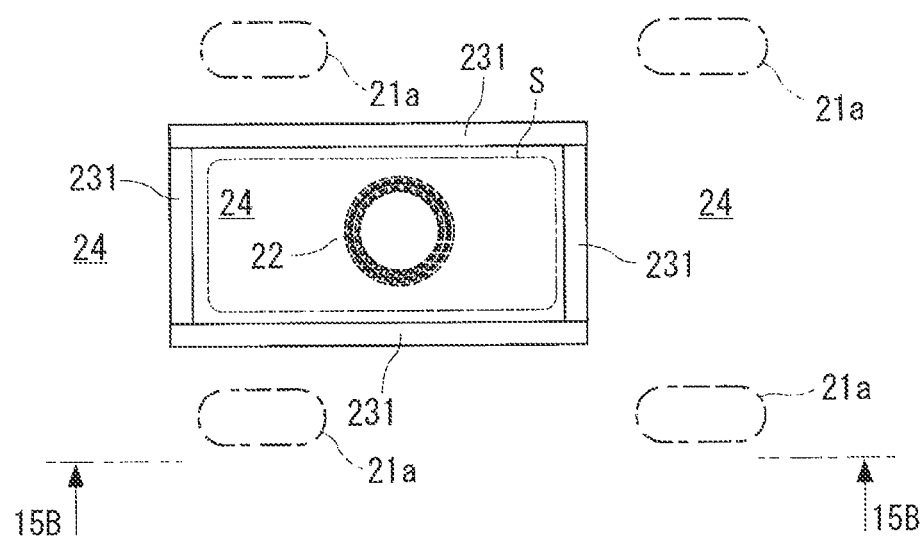
FIG. 15A is a plan view showing a problem in the related art.
Figure 15B:
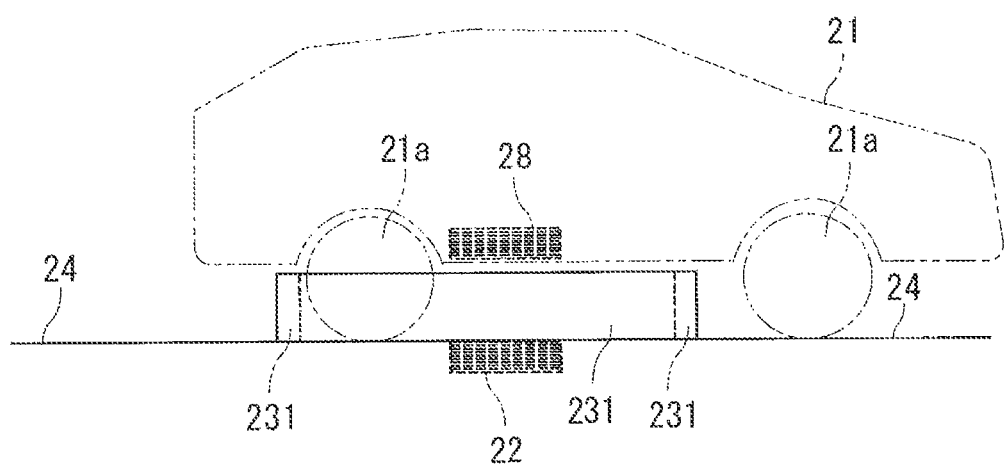
FIG. 15B is a view taken along 15B-15B line of FIG. 15A.

An outline of wireless power supply in the related art is described using FIGS. 15A and 15B. In the wireless power supply in the related art, for example, a shield member 231 is used. The electromagnetic field-generating space S is shielded by the shield member 231 against the outside of the space as shown in FIGS. 15A and 15B, whereby it is possible to reduce a radiated electromagnetic field, electric field, or magnetic field leaking to the outside. FIG. 15A is a plan view, and FIG. 15B is a view taken along 15B-15B line of FIG. 15A. In FIGS. 15A and 15B, the power-transmitting coil 22 is provided on the travelling surface 24. FIG. 15A shows only the tires 21a of the vehicle 21. In FIG. 15B, the power-receiving coil 28 of the vehicle 21 is arranged facing the power-transmitting coil 22.

As shown in FIG. 15B, the shield member 231 projects upward from the travelling surface 24 for the vehicle 21. Thus, it may be difficult for a person to pass through an area in which the shield member 231 is provided, or a satisfactory view may be impaired by the shield member 231. Accordingly, it is preferable that the shield member 231 be arranged in an accommodated position (for example, a position under the travelling surface 24) when wireless power supply is not performed, and the shield member 231 be moved from the accommodated position to an expanded position as shown in FIG. 15B when wireless power supply is performed.

If the shield member 231 is moved from the accommodated position to the expanded position in this way, a movement device which moves the shield member 231 is needed. In a case where the movement device is driven by electric power or the like supplied from the outside, if the movement device is omitted, the energy consumption (for example, the electric power consumption) of the movement device can be reduced.

According to the second embodiment, since the shield member 27 can be arranged in the accommodated position under the travelling surface 24 when wireless power supply to the vehicle 21 is not performed, ease of a person passing through the travelling surface 24 and a satisfactory view of the travelling surface 24 can be kept. Although the shield member 27 moves to the expanded position surrounding the power-transmitting coil 22 when wireless power supply is provided to the vehicle 21, this movement is performed using the weight of the vehicle 21. Therefore, a movement device, which is used for moving the shield member 27 from the accommodated position to the expanded position and is driven by electric power or the like from the outside, can be omitted, and saving of energy can be further realized.

The present disclosure is not limited to the above embodiment, and several modifications can be adopted within the scope of and not departing from the present disclosure. For example, one of the following modifications 1 to 5 may be solely adopted, or several of the modifications 1 to 5 may be optionally combined and adopted. In this case, components not described in the following are the same as the above.
(Modification 1)

The pedal member 25 may be used as a first pedal member, and each of the first and second structures 23*a* and 23*b* may include a second pedal member 229 as shown in FIGS. 10A, 10B, 11A and 11B. The second pedal member 229 is formed in a rectangular plate shape. The second pedal member 229 is also configured to move between a standing position and a falling position similarly to the pedal member 25.

Figure 10A:
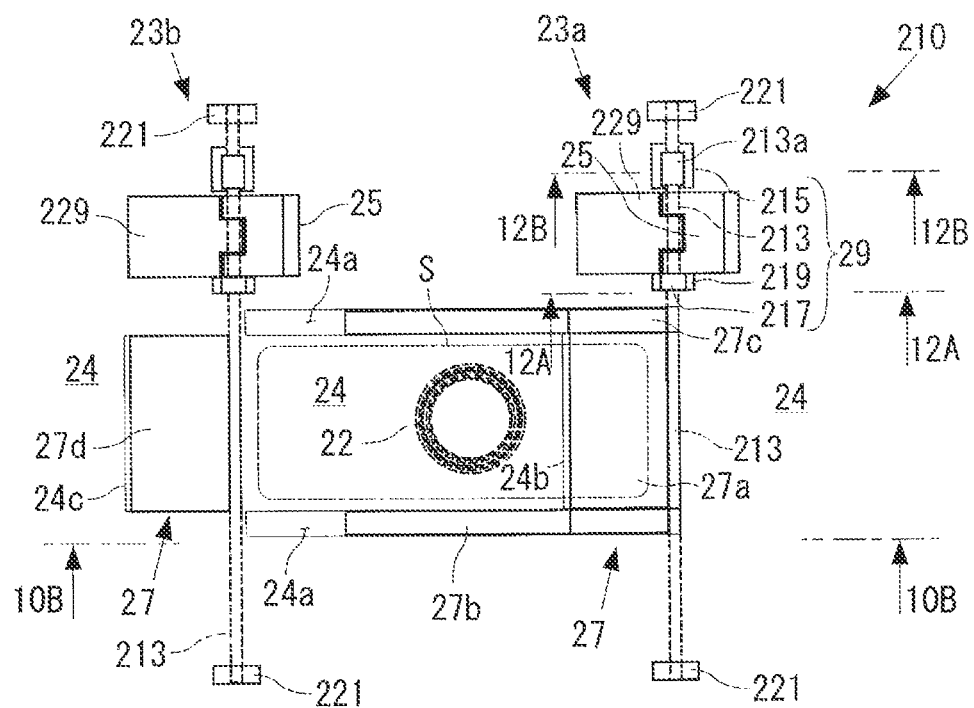
FIG. 10A is a plan view showing a state of a shield apparatus of a modification of the second embodiment of the present disclosure before a vehicle enters the power-supplying position.
Figure 10B:
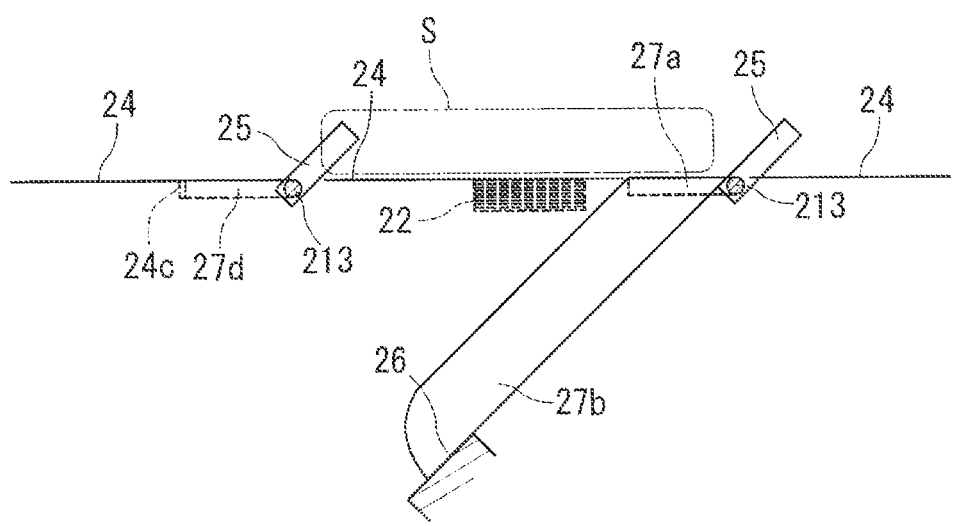
FIG. 10B is a view taken along 10B-10B line of FIG. 10A.
Figure 11A:
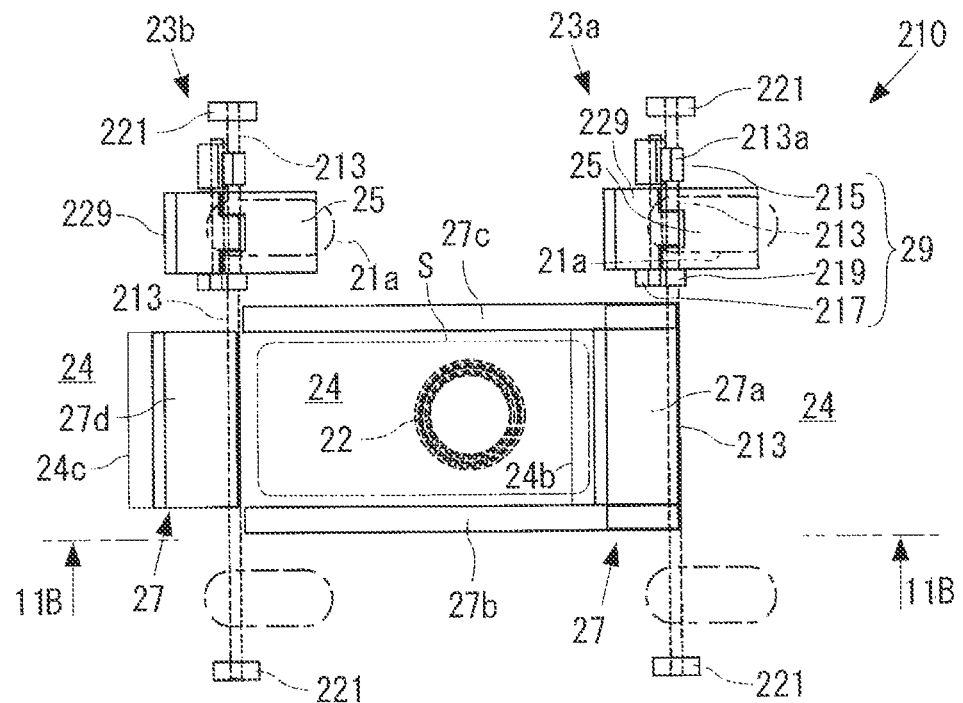
FIG. 11A is a plan view showing a state of the shield apparatus of the second embodiment of the present disclosure at the time the vehicle stops at the power-supplying position.
Figure 11B:
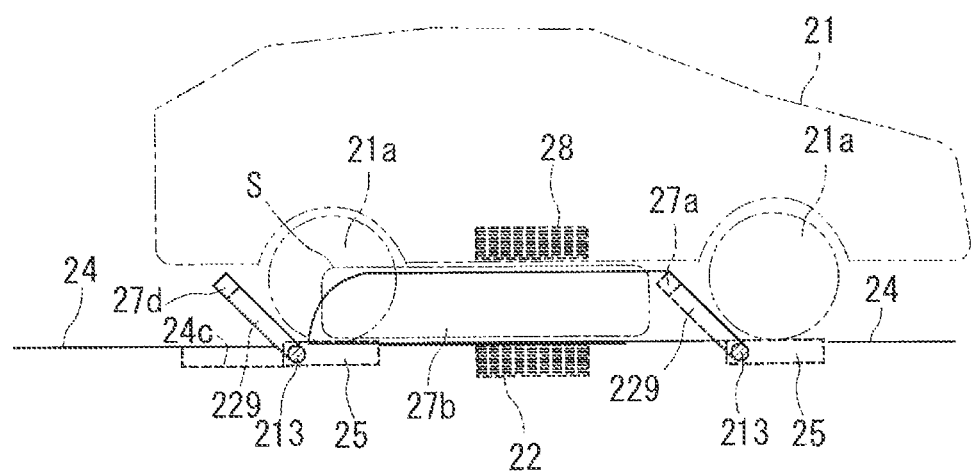
FIG. 11B is a view taken along 11B-11B line of FIG. 11A.

FIG. 10A is a plan view of the shield apparatus 210, and FIG. 10B is a view taken along 10B-10B line of FIG. 10A. FIG. 11A is a plan view of the shield apparatus 210, and FIG. 11B is a view taken along 11B-11B line of FIG. 11A. FIGS. 10A and 10B show a state before the vehicle 21 enters the power-supplying position. FIGS. 11A and 11B show a state where the vehicle 21 stops at the power-supplying position.

In this modification, the motor 215 rotates, whereby the pedal member 25 rotates only by an angle less than 90° (for example, by 45°) around the rotation axis C. Therefore, the pedal member 25 is moved from the falling position to the standing position, or is moved from the standing position to the falling position.

The second pedal member 229 is fixed to the rotary shaft 213. That is, the second pedal member 229 is fixed to the shield member 27 via the rotary shaft 213. Thus, the second pedal member 229 is movable integrally with the shield member 27.

In a state where the shield member 27 is at the accommodated position, the second pedal member 229 is at the falling position as shown in FIGS. 10A and 10B, and a flat upper surface of the second pedal member 229 is positioned at approximately the same height as the travelling surface 24. In this state, a tire 21*a* of the vehicle 21 can roll on the upper surface of the second pedal member 229.

In contrast, in a state where the shield member 27 is at the expanded position, the second pedal member 229 is at the standing position as shown in FIGS. 11A and 11B.

The shield member 27 of this modification is configured to move from the expanded position to the accommodated position at the same time as movement of the second pedal member 229 from the standing position to the falling position caused by a tire 21*a* of the vehicle 21 trampling down the second pedal member 229 when the vehicle 21 travels from the power-supplying position toward the outside of the power-supplying area T.

Figure 12A:
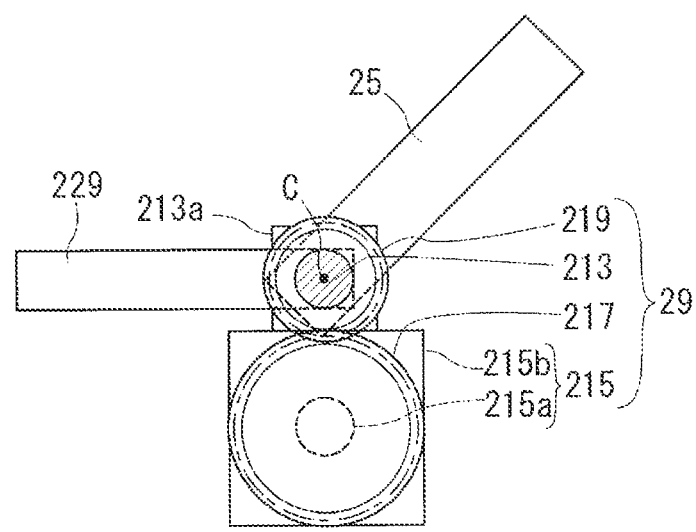
FIG. 12A is a view taken along 12A-12A line of FIG. 10A.
Figure 12B:
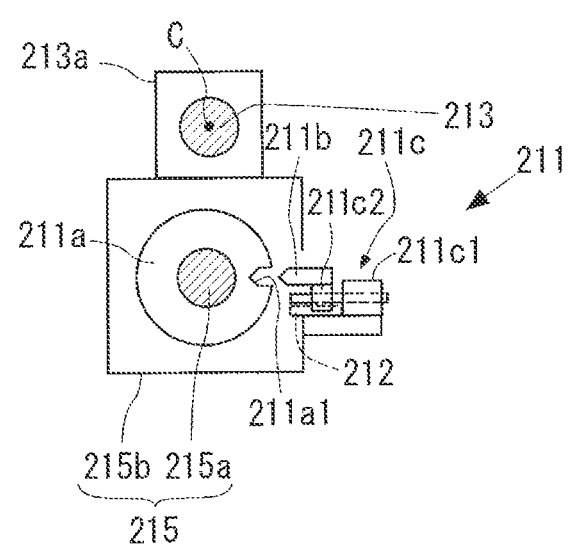
FIG. 12B is a view taken along 12B-12B line of FIG. 10A.

FIG. 12A is a view taken along 12A-12A line of FIG. 10A, and shows the structure of the movement device 29. FIG. 12B is a view taken along 12B-12B line of FIG. 10A, and shows the structure of the fixing mechanism 211. The structure and operation of the movement device 29 are the same as those of the movement device 29 shown in FIG. 8A. The structure and operation of the fixing mechanism 211 are the same as those of the fixing mechanism 211 shown in FIG. 8B. However, the movement device 29 of this modification rotates the pedal member 25 only by an angle less than 90° (for example, by 45°) around the rotation axis C.

In this modification 1, the holding member 227, the position detector related to the holding member 227, and the drive device for the holding member 227 are omitted. Instead of these, in the step S5, as shown in FIG. 11B, a tire 21*a* of the vehicle 21 at the power-supplying position is placed on the pedal member 25, whereby the pedal member 25 is held in the falling position and the shield member 27 is held in the expanded position. That is, the pedal member 25 (first pedal member) of this modification is arranged at a position under the tire 21*a* of the vehicle 21 stopped at the power-supplying position.

In the step S3, in the example of FIGS. 11A to 13C, the pedal member 25 rotates only by 45° around the rotation axis C, thereby moving from the falling position to the standing position.

In the step S5, in the example of FIGS. 10A to 12B, the pedal member 25 rotates only by 45° around the rotation axis C, thereby moving from the standing position to the falling position, and the shield member 27 rotates only by 45° around the rotation axis C, thereby moving from the accommodated position to the expanded position.

In the step S7, after charging of the battery of the vehicle 21 is finished, the vehicle 21 travels to the outside of the power-supplying area T in the opposite direction to the approach direction in the step S5. At this time, a tire 21*a* of the vehicle 21 tramples down the second pedal member 229, whereby the second pedal member 229 moves from the standing position to the falling position. Therefore, the first pedal member 25 moves from the falling position to the standing position, and the shield member 27 moves from the expanded position to the accommodated position.

Accordingly, the second pedal member 229 is arranged at a position (namely, a position on the above-described pass route) through which the tire 21*a* of the vehicle 21 passes, when the vehicle 21 travels from the power-supplying position to the outside of the power-supplying area T in the opposite direction to the approach direction.

In the step S8, when the vehicle 21 reaches the outside of the power-supplying area T in the step S7, the controller 225 controls the fixing mechanism 211 to cancel fixing of the pedal member 25 to the shield member 27 by the fixing mechanism 211. Therefore, the first pedal member 25 moves from the expanded position to the accommodated position due to its own weight.
(Modification 2)

In the second embodiment, the holding member 227, the position detector related to the holding member 227, and the drive device for the holding member 227 may be omitted. In this case, in the step S5, a tire 21*a* of the vehicle 21 at the power-supplying position is placed on the pedal member 25, whereby the pedal member 25 is held in the falling position, and the shield member 27 is held in the expanded position. That is, the pedal member 25 (first pedal member) of this modification is arranged at a position under the tire 21*a* of the vehicle 21 stopped at the power-supplying position.
(Modification 3)

When the ingress detector 223 detects ingress of the vehicle 21 into the power-supplying area T in the step S2, the ingress detector 223 obtains the identification information of the vehicle 21. When the ingress detector 223 determines, based on this identification information, that the vehicle 21 is a particular vehicle, the ingress detector 223 outputs the detection signal to the controller 225. The particular vehicle denotes a vehicle needing supply of electric power, namely an electric vehicle or a hybrid vehicle. This process may be performed through, for example, the following method 1 or 2. However, this process may be performed through a method other than the following methods 1 and 2.

The method 1 is performed as follows. The ingress detector 223 includes a communication device. When the ingress detector 223 detects ingress of the vehicle 21 into the power-supplying area T in the step S2, the communication device receives the identification information of the vehicle 21 from an on-board device of the vehicle 21 through dedicated short-range communication. When the ingress detector 223 determines, based on the identification information, that the vehicle 21 is a predetermined particular vehicle, the ingress detector 223 outputs the detection signal to the controller 225. That is, the ingress detector 223 includes a storage storing the identification information showing predetermined particular one or more of the vehicle 21, and a determinator which determines whether or not the identification information stored in the storage and the identification information received by the communication device correspond to each other. When the determinator determines that the identification information stored in the storage and the identification information received by the communication device correspond to each other, the ingress detector 223 outputs the detection signal to the controller 225 in the step S2. The method 1 is performed, for example, in a case where the power-supplying area T is provided in a coin-operated parking lot or another private parking lot.

In the method 1, the on-board device of the vehicle 21 does not output only the identification information of the vehicle 21, but may also output to the communication device, information indicating whether or not charging of the battery of the vehicle 21 is needed. In this case, the determinator may output the detection signal to the controller 225 when the vehicle 21 is a particular vehicle and the battery of the vehicle 21 has to be charged.

The method 2 is performed as follows. The ingress detector 223 includes a camera imaging the vehicle 21 and obtaining image data when the ingress detector 223 detects ingress of the vehicle 21 into the power-supplying area T in the step S2, and an image-processing device extracting the identification information (for example, a vehicle number shown in a number plate) of the vehicle 21 from the image data. When the ingress detector 223 determines, based on the identification information, that the vehicle 21 is a predetermined particular vehicle, the ingress detector 223 outputs the detection signal to the controller 225. That is, the ingress detector 223 includes a storage storing the identification information indicating predetermined particular vehicles 21, and a determinator which determines whether or not the identification information stored in the storage and the identification information extracted by the image-processing device correspond to each other. When the determinator determines that the identification information stored in the storage and the identification information extracted by the image-processing device correspond to each other, the ingress detector 223 outputs the detection signal to the controller 225 in the step S2. The method 2 is performed, for example, in a case where the power-supplying area T is a personal parking space provided in a house.

(Modification 4)

In the second embodiment, in the step S4, the controller 225 operates the fixing mechanism 211, whereby the pedal member 25 is fixed to the shield member 27. However, this fixing may be manually performed.

Figure 13A:
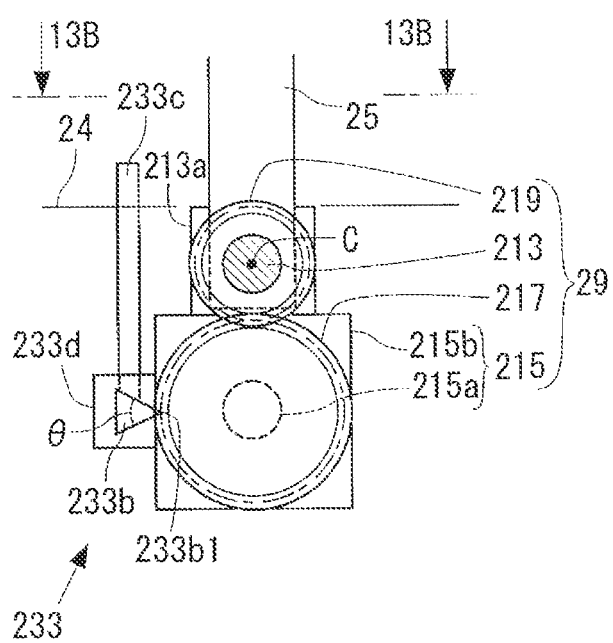
FIG. 13A is a cross-sectional view showing a fixing mechanism used to manually fix a pedal member to a shield member.
Figure 13B:
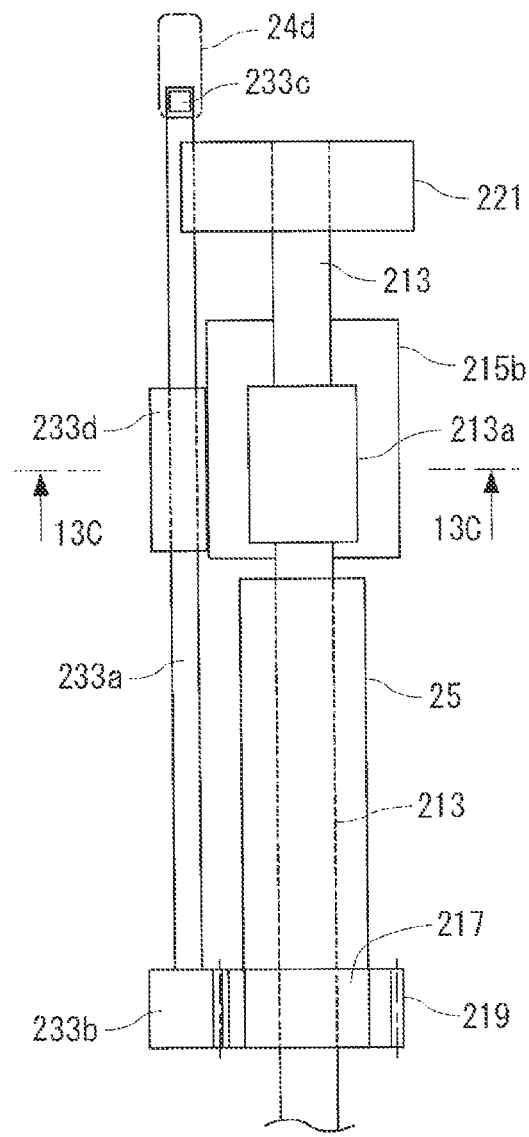
FIG. 13B is a view taken along 13B-13B line of FIG. 13A.
Figure 13C:
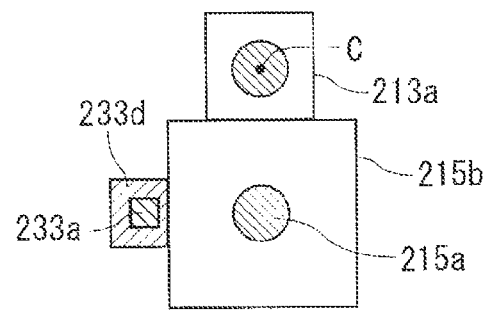
FIG. 13C is a view taken along 13C-13C line of FIG. 13B.

FIGS. 13A to 13C show a fixing mechanism 233 which manually fixes the pedal member 25 to the shield member 27. FIG. 13A corresponds to a view taken along 8A-8A line of FIG. 6A, and shows a case of providing the fixing mechanism 233. FIG. 13B is a view taken along 13B-13B line of FIG. 13A. FIG. 13C is a cross-sectional view taken along 13C-13C line of FIG. 13B. FIG. 13B is a view in which the travelling surface 24 is omitted and which penetrates structures under the travelling surface 24. FIG. 13B shows an opening 24d (described later) formed on the travelling surface 24.

The fixing mechanism 233 includes a rod member 233a, an engaging part 233b, an operating part 233c, and a guide member 233d.

The rod member 233a is movable in the axial direction of the output shaft 215a of the motor 215. Although the cross-section of the rod member 233a of this modification in a direction orthogonal to the longitudinal direction of the rod member 233a is formed in a rectangular shape, the cross-section is formed in at least a non-circular shape. A first end of the rod member 233a is attached with the engaging part 233b, and a second end of the rod member 233a is attached with the operating part 233c. The operating part 233c extends from the rod member 233a positioned under the travelling surface 24, to the upper side of the travelling surface 24. The travelling surface 24 is provided with the opening 24d through which the operating part 233c passes. The opening 24d extends elongated in the axial direction of the output shaft 215a so that the operating part 233c can move in the axial direction. A person can grip the operating part 233c above the travelling surface 24, and can reciprocate the rod member 233a together with the operating part 233c in the axial direction of the output shaft 215a. Accordingly, the engaging part 233b moves between a position of engaging with the first gear 217 and another position of not engaging with the first gear 217. The guide member 233d supports the weight of the rod member 233a while guiding reciprocation of the rod member 233a. The guide member 233d contacts an outer circumferential surface of the rod member 233a, thereby preventing rotation of the rod member 233a around the axis of the rod member 233a. The guide member 233d is fixed to the structure 215b on the stator side of the motor 215.

In FIG. 13A, the end part 233b1 of the engaging part 233b close to the first gear 217 is formed to be pointed. It is preferable that the angle θ (refer to FIG. 13A) of the tip of the end part 233b1 gradually decrease toward the end of the rod member 233a. Accordingly, when the rod member 233a is moved to the first end side of the rod member 233a, the tip of the end part 233b1 on the first end side (the lower side in FIG. 13B) of the rod member 233a is easily inserted between teeth next to each other of the first gear 217. The end part 233b1 of the engaging part 233b is inserted between teeth next to each other of the first gear 217, whereby the engaging part 233b engages with the first gear 217 and prevents rotation of the first gear 217.

In this case, in the step S4, a person (for example, a person temporarily getting out of the vehicle 21) moves the operating part 233c, thereby engaging the engaging part 233b with the first gear 217. Therefore, the first gear 217 cannot rotate relative to the guide member 233d. That is, the first gear 217 cannot rotate relative to the shield member 27 to which the guide member 233d is fixed via the structure 215b and the rotary shaft 213. Thus, the pedal member 25, to which the second gear 219 engaging with the first gear 217 is fixed, also cannot rotate. As a result, the pedal member 25 is fixed to the shield member 27.

In the step S8, a person (for example, a person temporarily getting out of the vehicle 21) moves the operating part 233c, thereby moving the engaging part 233b to the position of not engaging with the first gear 217. Therefore, the first gear 217 can rotate relative to the guide member 233d. As a result, fixing of the pedal member 25 to the shield member 27 by the fixing mechanism 233 is canceled.

In this way, the shield apparatus 210 of this modification includes the fixing mechanism 233 instead of the fixing mechanism 211. However, a mechanism which manually fixes the pedal member 25 to the shield member 27 is not limited to the fixing mechanism 233, and may be another appropriate structure. For example, the shield apparatus 210 may include a fixing mechanism 235 shown in FIGS. 14A to 14D instead of the fixing mechanism 233.

Figure 14A:
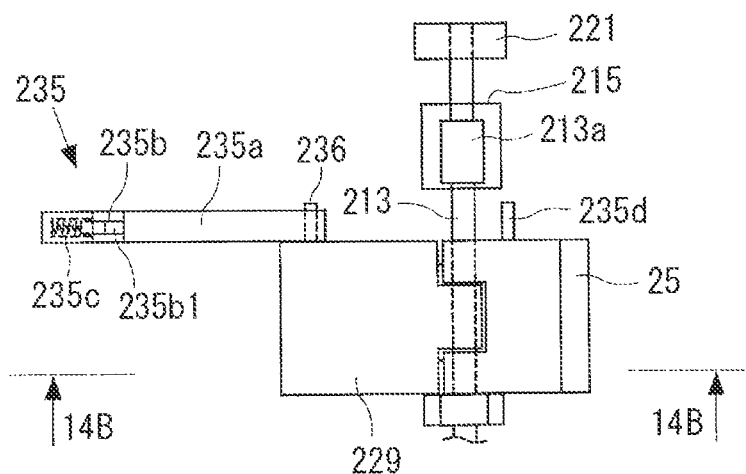
FIG. 14A is a plan view showing another fixing mechanism used to manually fix the pedal member to the shield member.
Figure 14B:
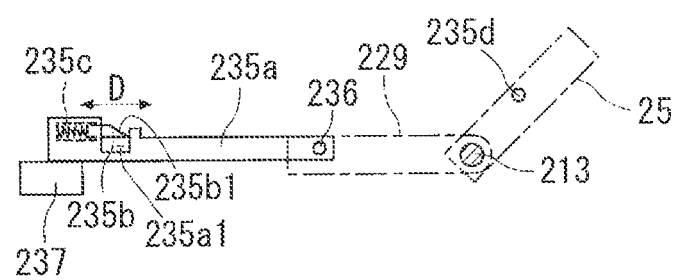
FIG. 14B is a view taken along 14B-14B line of FIG. 14A.
Figure 14C:
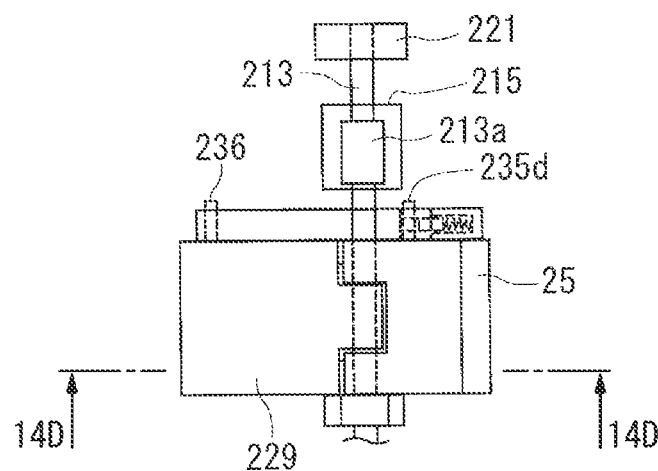
FIG. 14C is a plan view showing a state where the other fixing mechanism fixes the pedal member to the shield member.
Figure 14D:
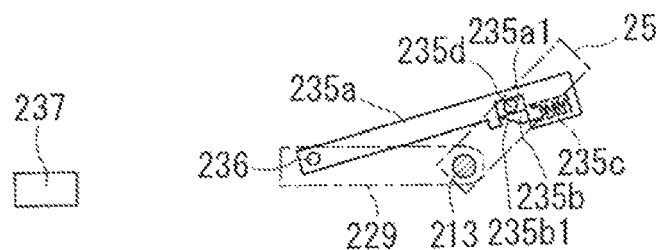
FIG. 14D is a view taken along 14D-14D line of FIG. 14C.

FIG. 14A corresponds to a partially enlarged view of FIG. 10A, and shows a case of providing the fixing mechanism 235. FIG. 14B is a view taken along 14B-14B line of FIG. 14A. In FIG. 14B, the fixing mechanism 235 is mainly shown, and the pedal member 25 and the second pedal member 229 are shown by dashed-dotted lines. FIGS. 14C and 14D correspond to FIGS. 14A and 14B, respectively, and show a state where the pedal member 25 is fixed to the shield member 27 by the fixing mechanism 235. That is, FIG. 14C is a plan view showing a state where the fixing mechanism 235 fixes the pedal member 25 to the shield member 27. FIG. 14D is a view taken along 14D-14D line of FIG. 14C.

The fixing mechanism 235 includes a hook member 235a, an engaging part 235b, a spring 235c, and a pin 235d.

A first end of the hook member 235a is attached to the second pedal member 229 to be rotatable around a pin 236. A second end of the hook member 235a is provided with the engaging part 235b. The engaging part 235b can reciprocate in the direction shown by an arrow D of FIG. 14B relative to the hook member 235a, and opens or closes an internal space 235a1 (a recess) of the hook member 235a in the rotation direction of the hook member 235a. The engaging part 235b is always pushed in the direction in which the engaging part 235b closes the internal space 235a1, namely, in the forward direction, by the spring 235c provided in the hook member 235a. The pin 235d is provided in the pedal member 25. A person rotates the hook member 235a from a state of FIG. 14A, and presses an inclined surface 235b1 of the engaging part 235b onto the pin 235d, whereby the engaging part 235b moves backward and opens the internal space 235a1. As a result, the pin 235d enters the internal space 235a1, and thereafter the engaging part 235b moves forward by being pushed by the spring 235c and closes the internal space 235a1. Therefore, the fixing mechanism 235 becomes a state shown in FIGS. 14C and 14D. In the state of FIGS. 14C and 14D, the pedal member 25 is fixed to the shield member 27.

In FIG. 14B, the weight of the hook member 235a is supported by an appropriate support member 237. Although not shown, the travelling surface 24 is provided with an opening matching the shape of the hook member 235a, and the hook member 235a passes through the opening and thus can move from a state of FIG. 14A to a state of FIG. 14C.

In a case of FIGS. 14A to 14D, in the step S4, a person rotates the hook member 235a, whereby the pedal member 25 is fixed to the shield member 27 as described above. Thereafter, in the step S8, a person pushes by hand and moves the engaging part 235b backward, rotates the hook member 235a, releases the hook member 235a from the pin 235d, and thus forms a state of, for example, FIG. 14A. In this way, fixing of the pedal member 25 to the shield member 27 by the fixing mechanism 235 is canceled.

(Modification 5)

The vehicle 21 is at least a vehicle needing supply of electric power from the outside, and may be a vehicle driven in combination with a driving method other than electric power, for example, a plug-in hybrid vehicle. The vehicle 21 may be a vehicle including a power-supplied apparatus such as a freezer other than a vehicle-driving apparatus, and may have a configuration in which electric power is supplied to the power-supplied apparatus using the wireless power supply system of the present disclosure.

Hereinbefore, although preferable embodiments of the present disclosure are described with reference to the attached drawings, the present disclosure is not limited to the above embodiments. The shape, the combination or the like of each component shown in the above embodiments is an example, and additions, omissions, replacements, and other modifications based on design requests or the like can be adopted within the scope of and not departing from the present disclosure.

For example, the configurations of the first and second embodiments may be combined together, and the shield member-expanding mechanism of the second embodiment using the weight of a vehicle may be used for expanding (swelling) the multilayer magnetic shield member of the first embodiment. Specifically, instead of the shield member 27 of the second embodiment, for example, a rod-shaped link member is fixed to the rotary shaft 213. An end of the link member is made to contact the under surface of the cover member 132 of the first embodiment. In this case, it is preferable that the end of the link member be slidable on the under surface of the cover member 132 in the horizontal direction, and the end of the link member may be provided with a slide member, a roller or the like. When a tire of a vehicle tramples down the pedal member 25, the end of the link member moves up because the link member is integrally fixed to the pedal member 25 via the rotary shaft 213, and the cover member 132 is pushed by the end of the link member from the lower side of the cover member 132, thereby being lifted. Therefore, the multilayer magnetic shield member 131 (the base member 131a) connected to the cover member 132 is expanded and swelled. In a case where the cover member 132 is not provided, the end of the link member may be connected to the upper end of the multilayer magnetic shield member 131.

The structure of the multilayer magnetic shield member 131 of the first embodiment may be applied to the shield member 27 of the second embodiment. Since the multilayer magnetic shield member 131 is configured of a plurality of films or sheets, it is possible to reduce the weight of a shield member.

INDUSTRIAL APPLICABILITY

The present disclosure can be used for a shield apparatus which reduces magnetic-flux leakage during wireless power supply, and for a wireless power supply system using the shield apparatus.

The invention claimed is:

1. A shield apparatus used during wireless power supply from a power-transmitting coil to a power-receiving coil of a vehicle, the shield apparatus comprising:
   a multilayer magnetic shield member installed around the power-transmitting coil and arranged so as to surround a space between the power-transmitting coil and the power-receiving coil during supply of electric power, wherein
   the multilayer magnetic shield member comprises a base member configured to swell and shrink.

2. The shield apparatus according to claim 1,
   wherein the base member comprises a plurality of base materials disposed in layers, and the multilayer magnetic shield member comprises:
a shield formed of at least one of a magnetic material and a conductive material on surfaces of the base materials comprised in the base member.

3. The shield apparatus according to claim 2, further comprising:
a cover member provided on an upper part of the multilayer magnetic shield member so as to cover an upper side of the power-transmitting coil and the multilayer magnetic shield member.

4. The shield apparatus according to claim 3,
wherein at least part of the cover member overlapping with the power-transmitting coil in plan view is formed of a non-magnetic material.

5. A wireless power supply system comprising:
the shield apparatus and the power-transmitting coil according to claim 4.

6. The shield apparatus according to claim 3,
wherein the multilayer magnetic shield member is configured to be accommodated in a space between the cover member and a ground surface in a state of being folded when the base member shrinks.

7. A wireless power supply system comprising:
the shield apparatus and the power-transmitting coil according to claim 6.

8. A wireless power supply system comprising:
the shield apparatus and the power-transmitting coil according to claim 3.

9. The shield apparatus according to claim 2, further comprising:
a supply-and-exhaust device performing supply and exhaust of gas used for swelling and shrinking the base member of the multilayer magnetic shield member.

10. A wireless power supply system comprising:
the shield apparatus and the power-transmitting coil according to claim 9.

11. A wireless power supply system comprising:
the shield apparatus and the power-transmitting coil according to claim 2.

12. A wireless power supply system comprising:
the shield apparatus and the power-transmitting coil according to claim 1.

13. A shield apparatus shielding an electromagnetic field-generating space between a vehicle and a power-transmitting coil against the outside of the space during wireless power supply from the power-transmitting coil to the vehicle stopped at a power-supplying position within a power-supplying area, the shield apparatus comprising:
a first pedal member arranged at a position through which a tire of the vehicle travelling to the power-supplying position passes or at another position under the tire of the vehicle stopped at the power-supplying position;
a shield member shielding the electromagnetic field-generating space against the outside; and
a fixing mechanism configured to switch between a state where the first pedal member is fixed to the shield member and the first pedal member and the shield member are unified, and another state where unification of the first pedal member and the shield member is canceled,
wherein the shield member is configured to move between an accommodated position in which the electromagnetic field-generating space is opened to the outside, and an expanded position in which the electromagnetic field-generating space is shielded against the outside,
the first pedal member is configured to move between a standing position and a falling position, and
the shield member is configured to move from the accommodated position to the expanded position at the same time as movement of the first pedal member from the standing position to the falling position caused by a tire of the vehicle trampling down the first pedal member when the vehicle travels to the power-supplying position in a state where the fixing mechanism fixes the first pedal member to the shield member and unifies the first pedal member and the shield member together.

14. The shield apparatus according to claim 13, further comprising:
an ingress detector detecting ingress of the vehicle into the power-supplying area and outputting a detection signal;
a movement device moving the first pedal member from the falling position to the standing position; and
a controller controlling the movement device and the fixing mechanism,
wherein the controller is configured to control the movement device to move the first pedal member from the falling position to the standing position in a state where fixing of the first pedal member to the shield member by the fixing mechanism is canceled, while the shield member is held in the accommodated position, when the detection signal output from the ingress detector is input into the controller, and is configured to control the fixing mechanism to fix the first pedal member to the shield member.

15. The shield apparatus according to claim 14,
wherein the ingress detector is configured to obtain identification information of the vehicle entering the power-supplying area, and to output the detection signal to the controller when the ingress detector determines, based on the identification information, that the vehicle needs supply of electric power.

16. A wireless power supply system comprising:
the shield apparatus and the power-transmitting coil according to claim 15.

17. A wireless power supply system comprising:
the shield apparatus and the power-transmitting coil according to claim 14.

18. The shield apparatus according to claim 13, further comprising:
a second pedal member fixed to the shield member and configured to move integrally with the shield member,
wherein the second pedal member is arranged at a position through which a tire of the vehicle passes, the vehicle travelling from the power-supplying position to the outside of the power-supplying area,
the second pedal member is configured to be at a falling position in a state where the shield member is at the accommodated position, and to be at a standing position in a state where the shield member is at the expanded position, and
the shield member is configured to move from the expanded position to the accommodated position at the same time as movement of the second pedal member from the standing position to the falling position caused by the tire of the vehicle trampling down the second pedal member when the vehicle travels from the power-supplying position to the outside of the power-supplying area.

19. A wireless power supply system comprising:
the shield apparatus and the power-transmitting coil according to claim 18.

20. A wireless power supply system comprising:
the shield apparatus and the power-transmitting coil according to claim 13.

* * * * *